(12) United States Patent
Kumawat

(10) Patent No.: US 11,501,477 B2
(45) Date of Patent: Nov. 15, 2022

(54) CUSTOMIZING FONT BOUNDING BOXES FOR VARIABLE FONTS

(71) Applicant: Adobe Inc., San Jose, CA (US)

(72) Inventor: Nirmal Kumawat, Dhoinda (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/208,297

(22) Filed: Mar. 22, 2021

(65) Prior Publication Data
US 2022/0301244 A1    Sep. 22, 2022

(51) Int. Cl.
*G06T 11/60*   (2006.01)
*G06T 11/20*   (2006.01)

(52) U.S. Cl.
CPC ............ *G06T 11/60* (2013.01); *G06T 11/203* (2013.01); *G06T 2200/24* (2013.01); *G06T 2210/12* (2013.01)

(58) Field of Classification Search
CPC ... G06T 11/60; G06T 11/203; G06T 2200/24; G06T 2210/12
See application file for complete search history.

(56) References Cited

U.S. PATENT DOCUMENTS

| | | | | |
|---|---|---|---|---|
| 5,706,364 | A * | 1/1998 | Kopec | G06K 9/6255 706/12 |
| 7,554,689 | B2 * | 6/2009 | Tonisson | G06F 40/186 358/1.18 |
| 7,623,130 | B1 * | 11/2009 | Burkey | G06F 40/109 345/469 |
| 7,982,737 | B2 * | 7/2011 | Leroy | G06F 40/109 345/467 |
| 8,633,930 | B2 * | 1/2014 | Mansfield | G06T 11/60 345/472.3 |
| 9,075,933 | B2 * | 7/2015 | Stone | G06F 30/00 |
| 9,319,444 | B2 * | 4/2016 | Levantovsky | H04N 21/435 |
| 9,684,986 | B1 * | 6/2017 | C | G06V 10/46 |
| 10,032,072 | B1 * | 7/2018 | Tran | H04N 5/23229 |

(Continued)

OTHER PUBLICATIONS

Wikipedia: The Free Encyclopedia; "Variable font"; Date downloaded Mar. 24, 2021; https://en.wikipedia.org/wiki/Variable_font.

(Continued)

*Primary Examiner* — Motilewa Good-Johnson
(74) *Attorney, Agent, or Firm* — Keller Preece PLLC

(57) ABSTRACT

This disclosure describes methods, non-transitory computer readable storage media, and systems that utilize glyph sets from predefined instances of variable fonts to customize font bounding boxes for custom instances of the variable fonts. The disclosed system customizes digital text including a variable font via one or more adjustable design axes. In response to a request to set a custom value of a design axis, the disclosed system determines a first and second predefined instances of the digital text. For example, the disclosed system determines a Euclidean distance between the custom value and corresponding values for the predefined instances. The disclosed systems determine sets of glyphs that contribute to the font bounding boxes of the first predefined instance and the second predefined instance. The disclosed systems generate a custom font bounding box for the digital text at the custom value of the design axis based on the glyph sets.

20 Claims, 15 Drawing Sheets

(56) References Cited

U.S. PATENT DOCUMENTS

| | | | | |
|---|---|---|---|---|
| 10,108,695 B1* | 10/2018 | Yeturu | ................ | G06F 16/955 |
| 10,210,141 B2* | 2/2019 | Kukreja | ................ | G06F 40/166 |
| 10,445,408 B2* | 10/2019 | Sinn | ................ | G06F 3/04842 |
| 10,832,376 B2* | 11/2020 | Peterson | ................ | G06T 3/4038 |
| 11,120,592 B2* | 9/2021 | Marinier | ................ | G06T 11/60 |
| 11,257,267 B2* | 2/2022 | Szarzynski | ................ | B25J 11/00 |
| 2005/0094205 A1* | 5/2005 | Lo | ................ | G06F 40/106 |
| | | | | 358/1.18 |
| 2013/0162681 A1* | 6/2013 | Peterson | ................ | G06T 15/30 |
| | | | | 345/647 |
| 2013/0201133 A1* | 8/2013 | Oh | ................ | G06F 3/04883 |
| | | | | 345/173 |
| 2014/0285495 A1* | 9/2014 | Kang | ................ | G06F 40/109 |
| | | | | 345/471 |
| 2017/0098141 A1* | 4/2017 | Wang | ................ | G06N 3/0454 |
| 2018/0096200 A1* | 4/2018 | Krivopaltsev | ................ | G06K 9/6255 |
| 2018/0373947 A1* | 12/2018 | Cho | ................ | G06V 10/454 |
| 2020/0026749 A1* | 1/2020 | Karlapudi | ................ | G06F 40/106 |
| 2020/0098091 A1* | 3/2020 | Peterson | ................ | G06T 3/0093 |
| 2020/0388082 A1* | 12/2020 | Peterson | ................ | G06F 3/04845 |
| 2021/0150789 A1* | 5/2021 | Szarzynski | ................ | B25J 11/0005 |

OTHER PUBLICATIONS

Microsoft.com; head—Font Header Table; Nov. 13, 2020; https://docs.microsoft.com/en-us/typography/opentype/spec/head.

Microsoft; OpenType Font Variations Overview; Oct. 23, 2020; https://docs.microsoft.com/en-us/typography/opentype/spec/otvaroverview#variation-%20data-tables-and-miscellaneous-requirements.

Microsoft; MVAR—Metrics Variations Table; Aug. 16, 2018; https://docs.microsoft.com/en-us/typography/opentype/spec/mvar.

Wikipedia: The Free Encyclopedia; Euclidean distance; Date downloaded Mar. 24, 2021; https://en.wikipedia.org/wiki/Euclidean_distance.

Microsoft; avar—Axis Variations Table; Oct. 23, 2020; https://docs.microsoft.com/en-us/typography/opentype/spec/avar.

Variable Fonts; A simple resource for finding and trying variable fonts; Date downloaded Mar. 24, 2021; https://v-fonts.com.

* cited by examiner

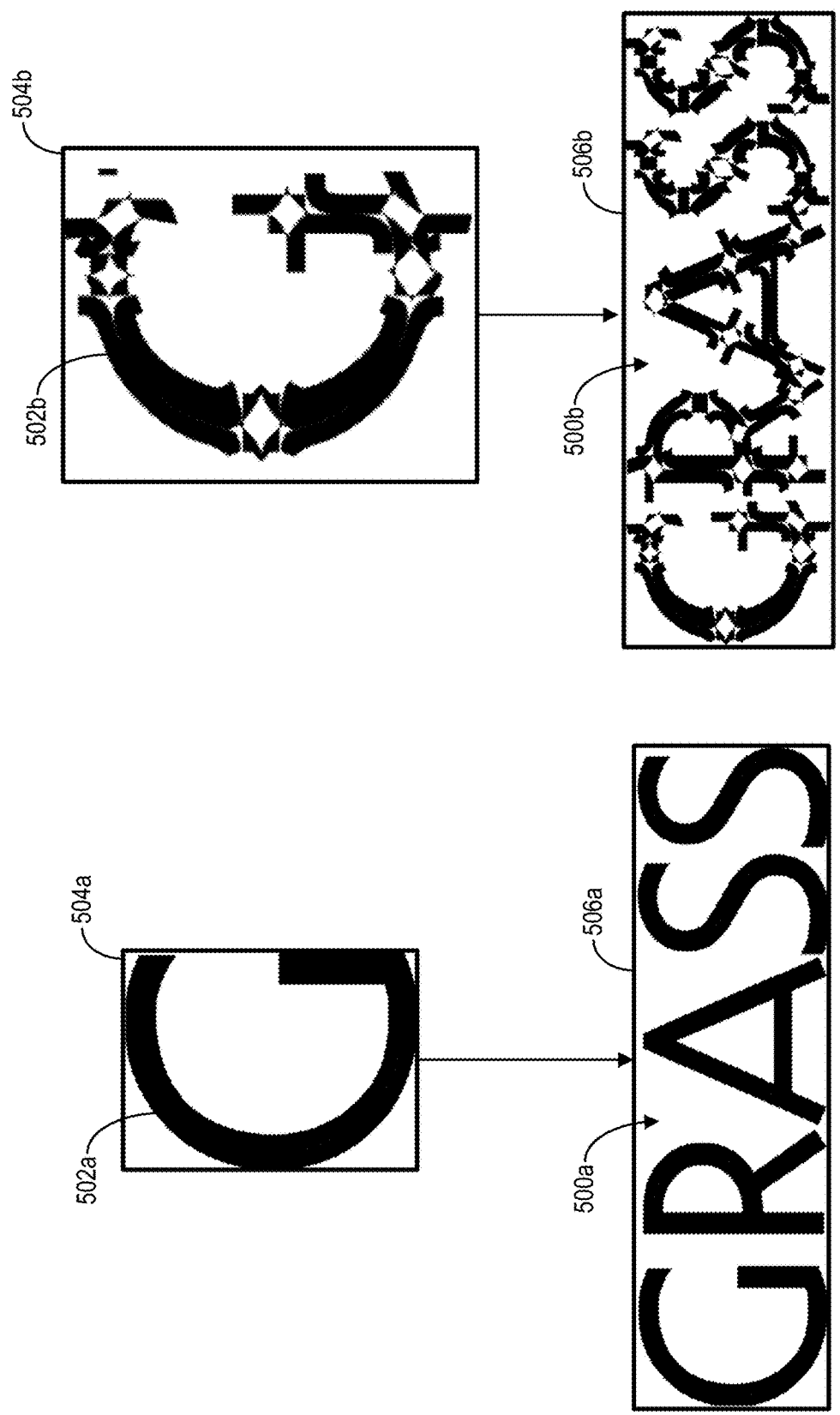

CUSTOMIZING FONT BOUNDING BOXES FOR VARIABLE FONTS

BACKGROUND

Digital typography is widely prevalent in many types of digital content ranging from professional uses such as digital marketing to non-professional uses including flyers and invitations. Font selection for digital text is an important aspect of digital typography in digital content creation, because fonts can affect tone and meaning in digital content while evoking specific emotions in readers/viewers. Additionally, fonts can influence other aspects of the digital text such as professionalism, readability, and presentability or printability (e.g., how easily the digital text is displayed or reproduced via a digital or physical medium). To assist digital content creators in selecting an appropriate font for a particular digital content item, some systems provide variable fonts that have customizable parameters that affect the shape of glyphs associated with the fonts.

In particular, variable fonts include one or more design axes that control one or more visual attributes of the digital text. For example, systems that implement variable fonts utilize the design axes to modify font outlines (e.g., shapes), font-weight, font-width, and other parameters. By allowing users to control font outlines with better precision than predefined instances with preset visual attributes, systems provide users with greater control over the visual aspects of digital text that can affect tone and meaning of digital content including the digital text.

Variable fonts include as few as a single design axis to a large number of different design axes (e.g., up to $2^{16}$ design axes) for modifying one or more visual attributes of glyphs in digital text. Accordingly, determining accurate spacing between lines of text (e.g., by accurately generating font bounding boxes) based on changes to values of design axes to maintain readability and consistency is an important part of digital text processing. Some variable font specifications (e.g., OpenType font specifications for variable fonts) do not provide a native way for computing font bounding boxes of instances of variable digital text (e.g., applying instance coordinates to default font bounding box corner points).

While some existing systems implement variable fonts in digital text editing applications, the existing systems lack efficiency in processing changes to variable fonts. Specifically, some existing systems generate font bounding boxes for digital text at user-selected values of design axes by iteratively processing all glyphs in each instance of the digital text to determine the minimum and maximum position values for the font bounding boxes. Due to the large number of possible values for each design axis, calculating the font bounding boxes at each possible value for each possible combination of glyphs can incur significant processing loads and times.

Additionally, some existing systems (e.g., some font specifications) utilize existing regions of variable fonts with a normalization mechanism to generate font bounding boxes of user-defined instances of digital text with the variable fonts. While such methods may be able to approximate font bounding boxes for some user-defined instances of a variable font, these systems can lack accuracy in calculating font bounding boxes for other instances. In particular, the number of regions for variable fonts can be very large. Accordingly, correctly generating region data for the regions during font production can be very difficult and error prone.

SUMMARY

This disclosure describes one or more embodiments of methods, non-transitory computer readable media, and systems that utilize glyph sets from predefined instances of variable fonts to customize font bounding boxes for custom instances of the variable fonts. The disclosed systems customize digital text including a variable font via one or more adjustable design axes. In response to a request to set a custom value of a design axis of the digital text, the disclosed systems determine a first design axis instance and a second design axis instance of the digital text. For example, the disclosed systems determine a distance between the custom value and corresponding values for the additional design axis instances. The disclosed systems determine sets of glyphs that contribute to the font bounding boxes of the first design axis instance and the second design axis instance. The disclosed systems generate a custom font bounding box for the digital text at the custom value of the design axis based on glyph bounding boxes for the glyph sets of the first design axis instance and the second design axis instance. In this manner, the disclosed systems improve the efficiency and accuracy of computing systems in digital typography.

BRIEF DESCRIPTION OF THE DRAWINGS

The detailed description refers to the drawings briefly described below.

FIG. 5 illustrates embodiments of glyph bounding boxes and font bounding boxes for different values of a design axis of a variable font in accordance with one or more implementations.

DETAILED DESCRIPTION

Figure 1:
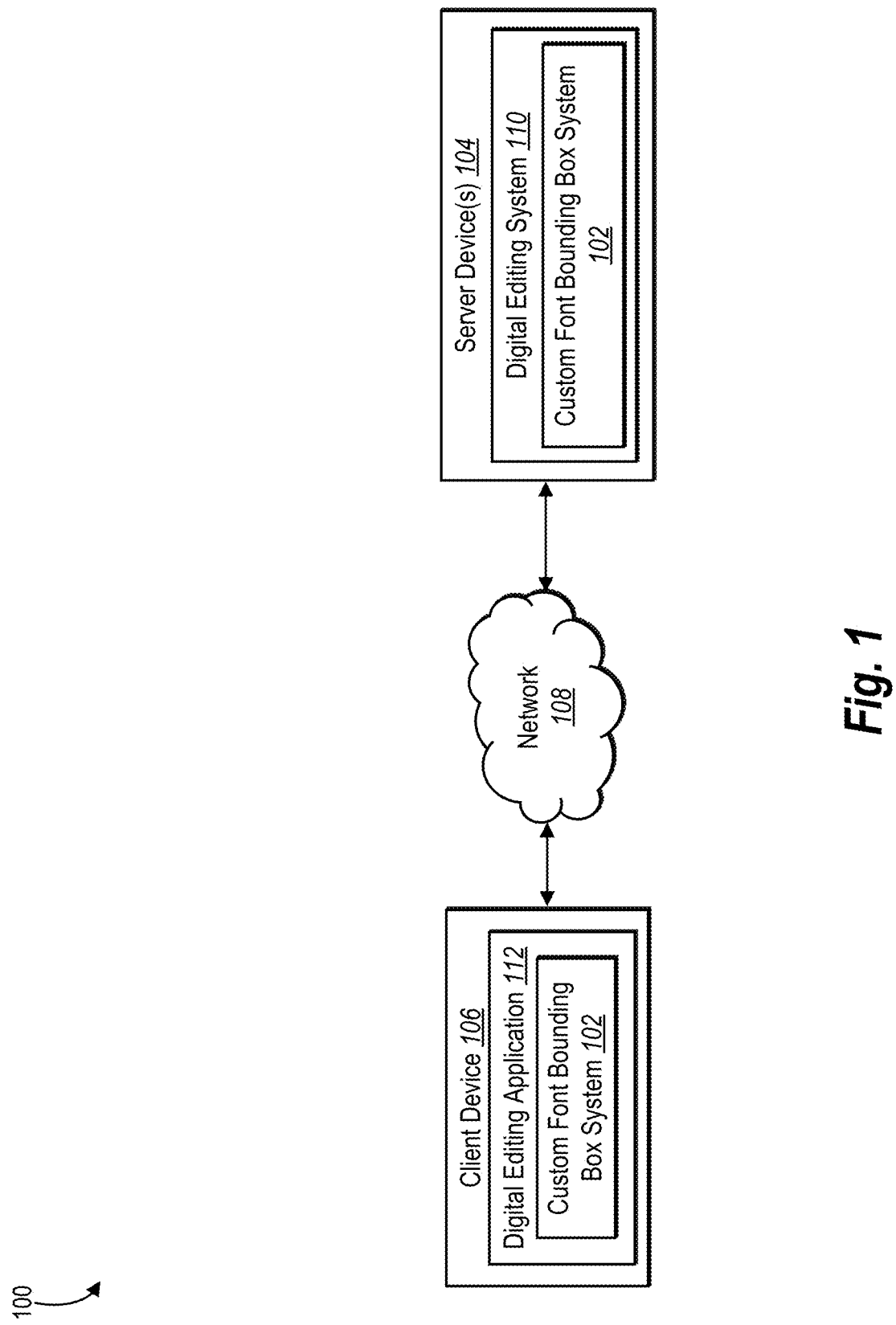
FIG. 1 illustrates a block diagram of a system environment in which a custom font bounding box system is implemented in accordance with one or more implementations.

This disclosure describes one or more embodiments of a custom font bounding box system that improves computing systems that generate font bounding boxes for digital text including variable fonts. Specifically, in one or more embodiments, the custom font bounding box system utilizes one or more design axis values for customizing digital text including a variable font based on a plurality of additional instances of the variable font. For example, the custom font bounding box system utilizes a custom value of a digital axis for a custom instance of digital text to determine additional instances associated with additional values of the digital axis. The custom font bounding box system also determines a set of glyphs that contributes to each separate instance of the variable font. The custom font bounding box system then generates a custom font bounding box based on the sets of glyphs corresponding to the additional instances by determining corner points of the custom font bounding box from glyph bounding boxes of the sets of glyphs. By determining font bounding box information utilizing glyph information from predetermined instances of a variable font, the custom font bounding box system efficiently and accurately generates font bounding boxes for a range of custom instances of the variable font.

In one or more embodiments, the custom font bounding box system receives a request to set a custom value of a design axis for digital text including a variable font in a digital content item. For example, the variable font includes one or more design axes to modify one or more visual attributes of digital text formatted with the variable font. To illustrate, the custom font bounding box system receives a request to generate a new custom instance of digital text with a specific custom value for a design axis associated with a variable font. Alternatively, the custom font bounding box system receives a request to modify an existing instance of digital text by setting a new custom value of a design axis associated with a variable font of the digital text.

According to one or more embodiments, the custom font bounding box system utilizes a custom value of a design axis of a variable font to determine additional instances (e.g., predefined design axis instances) of the variable font associated with additional values of the design axis. In particular, the custom font bounding box system determines a distance between a design vector (e.g., including one or more design axis values) of a custom instance of the variable font and design vectors for a plurality of predefined instances of the variable font. For instance, the custom font bounding box system converts design vectors for the custom instance and the plurality of predefined instances to normalized design vectors. The custom font bounding box system then sorts the predefined instances based on distance from the custom instance (e.g., by comparing the normalized design vectors). The custom font bounding box system then determines two or more instances of the variable font closest to the custom instance in the sorted list of predefined instances.

According to one or more embodiments, the custom font bounding box system determines a predefined instance of a variable font that includes a master instance of the variable font for digital text. For instance, the custom font bounding box system determines an instance based on a preset (e.g., named) set of design axis values of a variable font including, but not limited to, regular, bold, or italic. In alternative embodiments, the custom font bounding box system determines a predefined instance of a variable font according to one or more ranges of values of a particular design axis of a variable font. To illustrate, the custom font bounding box system determines an instance at upper or lower limit values, as well as at each point along a design axis at which the design axis changes slope (e.g., corresponding to different linear interpolations according to an axis variations table for the variable font).

After selecting instances of a variable font for digital text based on a custom value of a design axis, the custom font bounding box system determines glyph sets that contribute to the font bounding boxes of the selected instances. Specifically, the custom font bounding box system processes the glyph bounding boxes for each selected instance of the digital text to determine which glyphs contribute to a font bounding box for the selected instance. To illustrate, the custom font bounding box system determines that one or more glyph bounding boxes of a selected instance contribute to a first corner point of a font bounding box, one or more glyph bounding boxes contribute to a second corner point of a font bounding box, etc. Accordingly, the custom font bounding box system determines a first set of glyph bounding boxes (and corresponding glyphs) that contribute to corner points of the font bounding box of a first instance and a second set of glyph bounding boxes (and corresponding glyphs) that contribute to corner points of the font bounding box of a second instance.

In one or more embodiments, the custom font bounding box system utilizes glyph sets that contribute to font bounding boxes of a plurality of instances of a variable font to generate a custom font bounding box. For instance, the custom font bounding box system determines a union set of glyph bounding boxes from a first set of glyph bounding boxes for a first predefined instance and a second set of glyph bounding boxes for a second predefined instance. Thus, the custom font bounding box system identifies all glyphs that contribute to font bounding boxes across at least two separate predefined instances. The custom font bounding box system then utilizes glyph bounding boxes for the glyphs in the union set to generate the custom font bounding box of the custom instance for the digital text at one or more custom values of one or more design axes.

The disclosed custom font bounding box system provides a number of improvements over conventional systems. For example, the custom font bounding box system improves efficiency and accuracy relative to existing systems that calculate font bounding boxes for digital text including variable fonts. To illustrate, in contrast to the previously mentioned existing systems that inefficiently generate font bounding boxes by iteratively processing all glyphs within each instance of a variable font, the custom font bounding box system more efficiently generates font bounding boxes by leveraging font bounding box information for predefined instances of variable fonts. Indeed by utilizing limited sets of glyphs of similar instances of a variable font to generate custom font bounding boxes for custom instances, the custom font bounding box system provides efficient font bounding box generation. Improving the efficiency of font bounding box generation significantly reduces processing resource requirements, particularly when calculating font bounding boxes for many different instances of digital text.

Furthermore, the custom font bounding box system improves the accuracy of computer systems that provide variable fonts for digital text. In particular, in contrast to error prone existing systems that use existing variable font regions with normalization mechanisms to calculate font bounding boxes, the custom font bounding box system accurately generates font bounding boxes for a wide variety of custom instances of a variable font by utilizing glyph sets that contribute to font bounding boxes for a plurality of similar predefined instances. To illustrate, by identifying predefined instances based on a Euclidean distance between normalized design axis values of a plurality of predefined instances and a custom instance, the custom font bounding box system quickly determines a set of glyphs most likely to contribute to the font bounding box of the custom instance. In some embodiments, the custom font bounding box system uses the set of glyphs to accurately generate a font bounding box for a custom instance and then provide a buffer in the font bounding box to account for possible differences between the custom instance and predefined instances.

Turning now to the figures, FIG. 1 includes an embodiment of a system environment 100 in which a custom font bounding box system 102 operates. In particular, the system environment 100 includes server device(s) 104 and a client device 106 in communication via a network 108. Moreover, as shown, the server device(s) 104 include a digital editing system 110, which includes the custom font bounding box system 102. Additionally, the client device 106 includes a digital editing application 112.

As shown in FIG. 1, the server device(s) 104 includes or hosts the digital editing system 110. Specifically, the digital editing system 110 includes, or is part of, one or more systems that implement displaying and editing digital content such as digital text documents and/or digital images in one or more environments. For example, the digital editing system 110 provides tools for viewing, generating, editing, and/or otherwise interacting with digital content items including digital text. In one or more embodiments, the digital editing system 110 uses the digital content items in a variety of applications such as databases of digital media assets, digital video presentations, digital advertisements, virtual or augmented reality environments, or other environments that utilize digital images (including digital video). In one or more embodiments, the digital editing system 110 provides modified digital images to another system such as a system/application at the client device 106 or to a third-party system.

In one or more embodiments, a digital content item includes a computer representation of visual media. For instance, a digital content item includes a digital text document, a digital image, or digital video. According to various embodiments, a digital content item includes electronic documents, electronic messages, electronic advertisements, or any other combination of digital media. To illustrate, a digital content item includes only text or a combination of text and images including, but not limited to, an image advertisement or video advertisement provided to a user client device via one or more communication channels. In one or more embodiments, digital text includes a computer representation of one or more glyphs within digital content items. For example, digital text includes alphanumeric glyphs, symbol glyphs, or pictographic glyphs in a digital medium.

In connection with providing tools for managing digital content items, the digital editing system 110 utilizes the custom font bounding box system 102 to generate font bounding boxes for digital text. For example, the digital editing system 110 receives a request from the client device 106 or from another system to insert and/or modify digital text within a digital content item. The digital editing system 110 then uses the custom font bounding box system 102 to generate one or more font bounding boxes for one or more strings or lines of digital text within the digital content item.

According to one or more embodiments, a font bounding box includes a rectangle that encloses a string of glyphs in digital text. For instance, a font bounding box represents a rectangle that encloses all glyph bounding boxes of glyphs within digital text. In some embodiments, a font bounding box represents the smallest rectangle that encompasses all glyph bounding boxes in a string of digital text, though a font bounding box can include dimensions greater than the minimum dimensions for enclosing all glyph bounding boxes in a string of digital text. In additional embodiments, the custom font bounding box system utilizes font bounding boxes for digital text to determine spacing between different strings of digital text (e.g., spacing between lines of digital text).

Furthermore, in one or more embodiments, a glyph bounding box includes a rectangle that encloses a glyph in digital text. For example, a glyph bounding box represents the smallest rectangle that encompasses an outline or shape of a glyph. In one or more additional embodiments, a glyph bounding box includes corner points that indicate coordinates and orientation of the glyph within a digital content item. Additionally, in one or more embodiments, the custom font bounding box system utilizes glyph bounding boxes to determine spacing between glyphs in a string of digital text. Furthermore, a glyph bounding box contributes to (e.g., assists in determining) a font bounding box for a string of glyphs.

In some embodiments, the digital editing system 110 receives requests from client devices (e.g., the client device 106) to customize digital text. For example, the digital editing system 110 receives a request from the client device 106 to insert or modify digital text by formatting the digital text with a variable font (or by modifying attributes of text formatted with a variable font). The digital editing system 110 then utilizes the formatting data associated with the digital text to insert or modify the digital text. In connection with inserting or modifying the digital text, the custom font bounding box system 102 generates a font bounding box for the digital text according to the formatting data. As described in more detail below, the custom font bounding box system 102 utilizes the formatting data and additional data associated with the variable font to generate the font bounding box and then format digital text within a digital content item for display at the client device 106 (e.g., via the digital editing application 112).

In one or more embodiments, a variable font includes a font for digital text that includes one or more design axes for adjusting one or more visual attributes of the digital text along a continuous (or near-continuous) range of values. For example, a variable font includes, but is not limited to, one or more design axes for modifying a font weight, a font width, a font height, a font shape, a font slant, or other parameters within a single font file. To illustrate, a variable font includes one or more design axes to adjust individual portions or visual attributes along a range of values to customize digital text beyond selecting from predefined instances of the font.

Furthermore, in one or more embodiments, a design axis of a variable font includes a range of values for adjusting a particular aspect of a font design. For example, a design axis includes continuous (or near-continuous) values from a lower limit to an upper limit for customizing a visual attribute of text formatted with a font. More specifically, a design axis includes a range of values for user-modification of a shape of font outline (or contour) for digital text including the variable font. To illustrate, a design axis corresponds to a weight, width, height, shape, slant, ascender, descender, cap height, or other visual attribute of the font. In one or more embodiments, a single variable font includes a plurality of different design axes for controlling a plurality of different visual attributes of a glyph.

In one or more embodiments, a design axis instance (or instance of a variable font/digital text) includes a specific configuration of one or more design axes of digital text including a variable font. Specifically, a design axis instance includes digital text with oner or more values corresponding to one or more axes for digital text formatted with a variable font. In some embodiments, a design axis instance also include a specific set of glyphs of digital text formatted with a variable font. In one or more embodiments, a design axis instance includes a predefined instance such as a master instance (or named instance) with predefined values of design axes defined by a font designer such as bold, italic, etc., within a font file. In other embodiments, a design axis instance includes a predefined instance with a predefined set of design axis values determined based on one or more segmented portions of a design axis. Additionally, a custom instance includes one or more user-defined design axis values for digital text formatted with a variable font.

In one or more embodiments, the server device(s) 104 include a variety of computing devices, including those described below with reference to FIG. 13. For example, the server device(s) 104 includes one or more servers for storing and processing data associated with digital content items. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 13. Furthermore, although not shown in FIG. 1, the client device 106 can be operated by a user (e.g., a user included in, or associated with, the system environment 100) to perform a variety of functions. In particular, the client device 106 performs functions such as, but not limited to, accessing, viewing, analyzing, and interacting with digital content (e.g., digital images) via the digital editing application 112. The client device 106 also performs functions for generating, capturing, or accessing data to provide to the digital editing system 110 and the custom font bounding box system 102 in connection with editing digital text in digital content items. For example, the client device 106 communicates with the server device(s) 104 via the network 108 to provide digital text data (e.g., glyph information), font information, and design axis values associated with customizing digital text including a variable font. Although FIG. 1 illustrates the system environment 100 with a single client device 106, the system environment 100 can include a different number of client devices. Additionally, the server device(s) 104 and/or the client device 106 may access digital content and/or fonts from a third-party system via the network 108.

Additionally, as shown in FIG. 1, the system environment 100 includes the network 108. The network 108 enables communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 13. Although FIG. 1 illustrates the server device(s) 104 and the client device 106 communicating via the network 108, in alternative embodiments, the various components of the custom font bounding box system 102 communicate and/or interact via other methods (e.g., the server device(s) 104 and the client device 106 can communicate directly).

Furthermore, although the custom font bounding box system 102 has been described as being implemented by the server device(s) 104 within the system environment 100, the custom font bounding box system 102 can be implemented, in whole or in part, by other computing devices and/or components in the system environment 100. For example, as shown by FIG. 1, the custom font bounding box system 102 is optionally implemented by the client device 106 in addition to, or in place of implementation by the server device(s) 104.

In some implementations, the custom font bounding box system 102 on the server device(s) 104 supports the custom font bounding box system 102 on the client device 106. For instance, the client device 106 obtains (e.g., downloads) an instance of the custom font bounding box system 102 from the server device(s) 104. Once downloaded, the custom font bounding box system 102 on the client device 106 generates font bounding boxes independent from the server device(s) 104.

In alternative implementations, the custom font bounding box system 102 on the server device(s) includes a web hosting application that allows the client device 106 to interact with content and services hosted on the server device(s) 104. To illustrate, in one or more implementations, the client device 106 accesses a web page via the supported by the server device(s) 104. For example, the client device 106 provides an indication of a customized font to the server device(s) 104, and, in response, the custom font bounding box system 102 on the server device(s) 104 generates a customized font bounding box based on the customized font.

Figure 2:
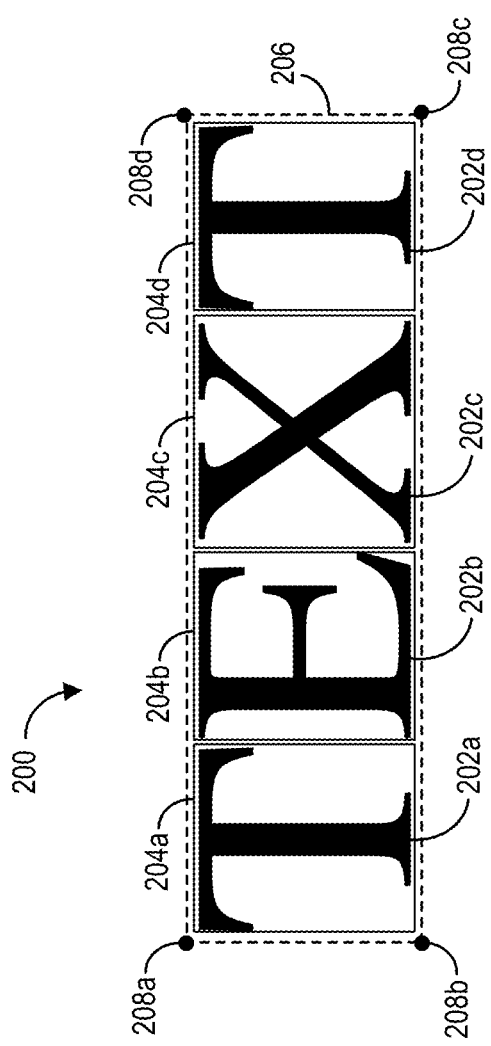
FIG. 2 illustrates an embodiment of a font bounding box for digital text in accordance with one or more implementations.

In one or more embodiments, the custom font bounding box system 102 accurately and efficiently generates font bounding boxes for digital text formatted with a variable font. FIG. 2 illustrates an embodiment of digital text 200 including a plurality of glyphs arranged in a word. Specifically, FIG. 2 illustrates the custom font bounding box system 102 generating glyph bounding boxes for the glyphs in the digital text 200. FIG. 2 further illustrates the custom font bounding box system 102 generating a font bounding box for the digital text based on the glyph bounding boxes.

As described previously, the custom font bounding box system 102 generates font bounding boxes for digital text for displaying digital text. In one or more embodiments, a digital editing system or a client device includes a font parser and/or a font engine that utilizes data associated with digital text and one or more associated fonts to determine how to render the digital text on a display device. Additionally, in some embodiments, the digital editing system or the client device renders the digital text according to a font specification (e.g., according to a particular standard associated with a font of the digital text).

As illustrated in FIG. 2, the digital text 200 includes a plurality of glyphs 202a-202d. Specifically, the glyphs 202a-202d in the digital text 200 of FIG. 2 form a word, though digital text can include any combination of glyphs to form words, phrases, sentences, paragraphs, or other grouping of glyphs. Furthermore, digital text can include numerical glyphs, pictographic glyphs, or other non-linguistic glyphs.

In one or more embodiments, the digital text 200 is formatted with a specific font. As described herein, the custom font bounding box system 102 processes digital text formatted with a variable font to generate font bounding boxes for the digital text. In one or more additional embodiments, the custom font bounding box system 102 also generates font bounding boxes for digital text formatted with non-variable fonts. Accordingly, the custom font bounding box system 102 generates and updates font bounding boxes for digital text in response to requests to insert or modify digital text within a digital content item.

In one or more embodiments, the custom font bounding box system 102 generates glyph bounding boxes 204a-204d for the glyphs 202a-202d. For example, the custom font bounding box system 102 generates a first glyph bounding box 204a to enclose a first glyph 202a. Specifically, the custom font bounding box system 102 generates the first glyph bounding box 204a to enclose an outline of the first glyph 202a. In some embodiments, the custom font bounding box system 102 generates glyph bounding boxes as rectangles that include edges at the minimum and maximum positions of the glyphs. Thus, although FIG. 2 illustrates a gap between some of the glyphs 202a-202d and the glyph bounding boxes 204a-204d, the custom font bounding box system 102 generates the glyph bounding boxes 204a-204d touching the outlines of the glyphs 202a-202d.

Additionally, FIG. 2 illustrates that the custom font bounding box system 102 generates a font bounding box 206 utilizing the glyph bounding boxes 204a-204d. In one or more embodiments, the custom font bounding box system 102 generates the font bounding box 206 based on coordinates of the glyph bounding boxes. For instance, the custom font bounding box system 102 generates the font bounding box 206 by determining one or more glyph bounding boxes that contribute to a plurality of corner points 208a-208d of the font bounding box 206.

To illustrate, the custom font bounding box system 102 determines that each of the glyph bounding boxes 204a-204d contribute to minimum and maximum y-values along a y-axis. The custom font bounding box system 102 also determines that the first glyph bounding box 204a and a fourth glyph bounding box 204d contribute to the minimum and maximum x-values along an x-axis, respectively. Based on the minimum and maximum values along each axis, the custom font bounding box system 102 generates coordinates of the corner points 208a-208d. If the size and/or shape of one or more glyphs changes, the custom font bounding box system re-calculates the glyph bounding boxes 204a-204d and the font bounding box 206.

Furthermore, while FIG. 2 shows a small gap between the font bounding box 206 and the glyph bounding boxes 204a-204d, in some embodiments, the custom font bounding box system 102 generates the font bounding box 206 (and corresponding corner points 208a-208d) such that there is no gap between the font bounding box 206 and the glyph bounding boxes 204a-204d. Accordingly, the font bounding box in such cases represents the smallest possible rectangle that encloses the glyph bounding boxes 204a-204d for the digital text 200. A tight font bounding box is useful for providing high accuracy in text layout within digital content items. In alternative embodiments, the custom font bounding box system 102 generates the font bounding box 206 to provide a small buffer between the font bounding box 206 and the glyph bounding boxes 204a-204d. For instance, the custom font bounding box system 102 generates a loose font bounding box to avoid recomputing the font bounding box for minor adjustments to the digital text 200.

For example, to generate a loose font bounding box, the custom font bounding box system 102 iterates through the glyphs of default instances of a variable and retrieves glyph bounding boxes for all the glyphs using the outline points. The custom font bounding box system 102 then determines all four corner points (xMin, yMin, xMax, yMax) with each glyph's four corner points. If any of the corner points match with a glyph, the custom font bounding box system 102 appends its glyph ID to a list. After iterating through all glyphs, the custom font bounding box system 102 determines a limited set of glyphs whose bounding boxes have contributed to at least one corner point of font's default bounding box. For example, xMin value of glyph 'g1' is matched with xMin value of font's default bounding box, yMin values of two glyphs 'g2' and 'g3' is matched with yMin of font's default bounding box. In this way, the custom font bounding box system 102 determines a list of glyphs (CachedGlyphSet) which are used to compute font's default bounding box.

The custom font bounding box system 102 utilizes the CachedGlyphSet to compute a font's bounding box for any custom instance. Upon changing of a design-vector, the custom font bounding box system 102 need not iterate through all the glyphs again to compute font's bounding box. Instead, the custom font bounding box system 102 utilizes the glyphs from CachedGlyphSet. At a particular custom instance (design-vectors), the custom font bounding box system 102 determines outline points of each glyph present in CachedGlyphSet. The custom font bounding box system 102 then computes each glyph's bounding box. The custom font bounding box system 102 then utilizes each glyph's bounding box to compute the respective font bounding box. In this way, the custom font bounding box system 102 does not need to iterate through all the glyphs every time to a font bounding box of a custom instance. To provide generate a loose or over-fitted font bounding box, the custom font bounding box system 102 adds a fixed delta to all four corner points to make the font bounding box larger by the delta value. As an example, a font bounding box determined for a custom instance using CachedGlyphSet={xMin, yMin, xMax, yMax}. To generate a loose font bounding box, the custom font bounding box system 102 sets the boundaries as: {xMin-delta, yMin-delta, xMax+delta, yMax+delta}. In one or more implementations, the custom font bounding box system 102 utilizes a delta value such as 4-5% of a minimum of (xMax, xMin, yMax, yMin).

Figure 3:
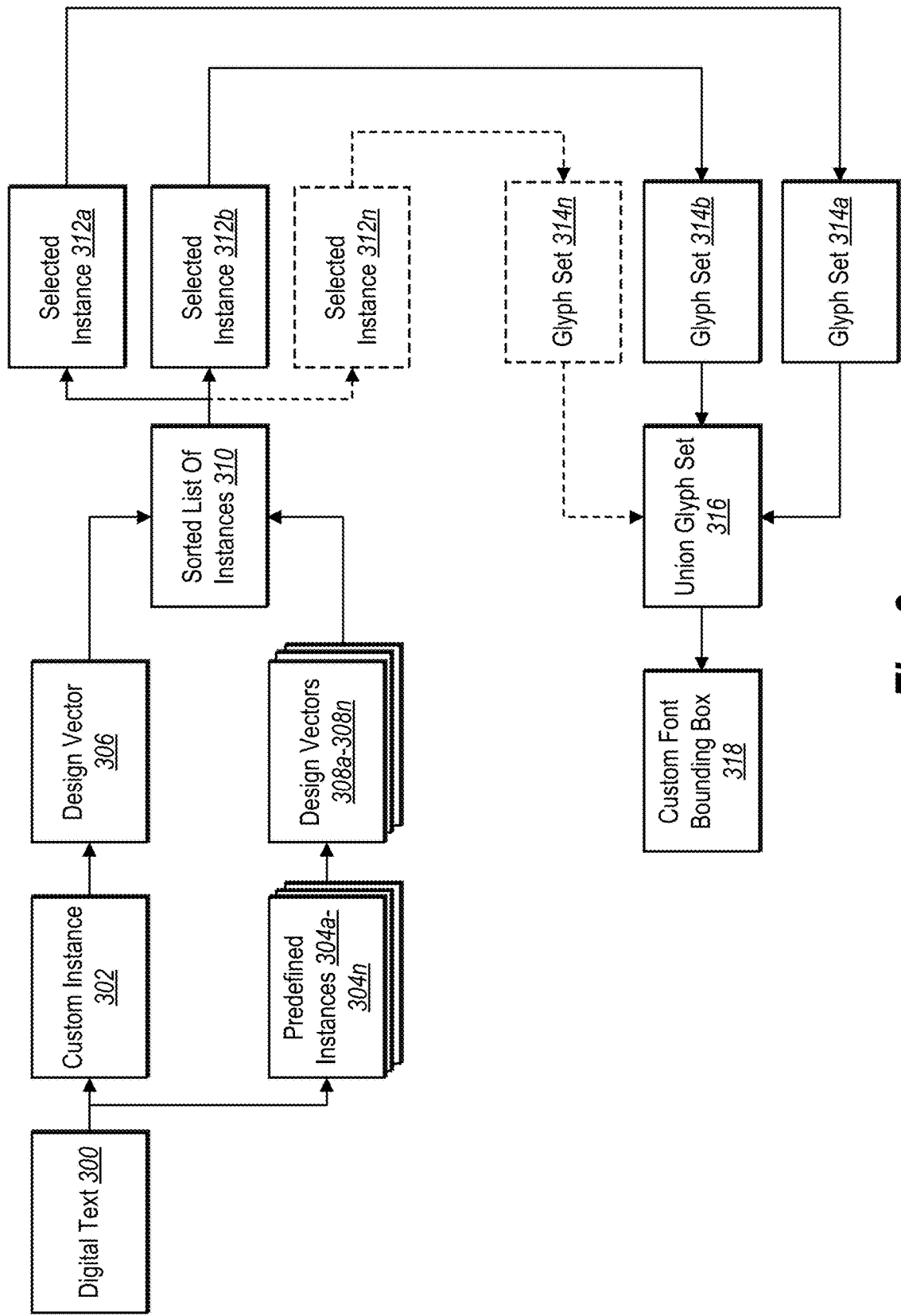
FIG. 3 illustrates an overview diagram of the custom font bounding box system generating a custom font bounding box for digital text in accordance with one or more implementations.

As previously mentioned, the custom font bounding box system 102 generates custom font bounding boxes for digital text at one or more custom values of one or more design vectors associated with a variable font. FIG. 3 illustrates an overview of the custom font bounding box system 102 generating a custom font bounding box for digital text formatted with a variable font. Specifically, FIG. 3 illustrates that the custom font bounding box system 102 utilizes font bounding box data for a plurality of predefined instances of a variable font to generate a font bounding box for a custom instance of the variable font.

As illustrated in FIG. 3, the custom font bounding box system 102 receives digital text 300 to customize within a digital content item. For instance, the custom font bounding box system 102 receives a request to insert the digital text 300 into the digital content item with one or more custom design axis values. Alternatively, the custom font bounding box system 102 receives a request to modify one or more design axis values of the digital text within the digital content item. To illustrate the custom font bounding box system 102 receives a request to set a custom value of at least one design axis that modifies a visual attribute of the digital text 300 according to the variable font with which the digital text 300 is formatted. In one or more embodiments, the custom font bounding box system 102 can also perform such a computation one time through a background thread for later use with one or more embodiments of digital text.

To compare the custom instance to the predefined instances 304a-304n, in one or more embodiments, the custom font bounding box system 102 compares values of design axes across the instances. For example, the custom font bounding box system 102 determines design vectors for each instance. As illustrated, the custom font bounding box system 102 determines a single design vector for the custom instance 302 and any number of design vectors for the predefined instances, depending on the number of predefined instances (e.g., named instances). In one or more embodiments, the custom font bounding box system 102 determines the design vectors 308a-308n for the predefined instances 304a-304n as in Algorithm 1 below:

Algorithm 1 Get Design-Vectors for all Named Instances

```
input : 'mFontDict' (FontDictionary of Variable Font)
output 'mNamedInstancesDVArray' (A mapping between Named Instance index and design-vector array )
:
mNumNamedInstances ← mFontDict.GetNumNamedInstances( );
    index = 0;
    for index < mNumNamedInstances; index + + do
    |  designVector ← mFontDict.GetNthNamedInstanceDesignVector(index));
    |    mNamedInstancesDVArray.insert(designVector);
    end
``` the custom font bounding box system 102 utilizes the custom value(s) of the one or more design axes to generate a custom instance 302 of the variable font.

FIG. 3 further illustrates that the custom font bounding box system 102 compares the custom instance 302 to a plurality of predefined instances 304a-304n. Specifically, each predefined instance corresponds to fixed values for the one or more design axes for the variable font. To illustrate, the predefined instances 304a-304n include one or more master instances of the variable font for the digital text 300, which can include selectable instances such as bold, italic, thin, etc. In one or more embodiments, a font specification indicates the master instances for the variable font and can include a small number or a large number of distinct master instances with different fixed values for the design axes of the variable font.

In alternative embodiments, the predefined instances 304a-304n include fixed values for one or more design axes of a variable font based on an axis variations table associated with the variable font. In one or more embodiments, an axis variations table includes an optional table associated with a variable font that modifies a specific aspect of a design axis. For instance, an axis variations table indicates a modification of coordinate normalization used when processing variation data for a particular design axis instance. To illustrate, an axis variations table modifies a linearity of a design axis at specific design axis values. Accordingly, the predefined instances 304a-304n alternatively corresponds to different instances for points along a design axis based on the axis variations table of the variable font.

In at least some embodiments in which each design axis is divided into three points such as lower, default, and upper design values, the custom font bounding box system 102 determines a number of predefined instances with M number of design axes as 3^M instances (i.e., based on the number of possible permutations). The number of instances changes depending on the number of segment points in each design axis (e.g., based on the axis variations table). Additionally, In particular, the custom font bounding box system 102 determines a design vector 306 corresponding to the custom instance 302 to include an array of all values of design axes for the custom instance 302. To illustrate, the design vector 306 for the custom instance 302 includes one or more design axis values that control the shape or outline of the glyphs in the digital text 300 based on the one or more design axes of the variable font. Additionally, the custom font bounding box system 102 determines design vectors 308a-308n corresponding to the predefined instances 304a-304n to include arrays of the values of the design axes for the predefined instances 304a-304n. For instance, the design vectors 308a-308n for each of the predefined instances 304a-304n include one or more corresponding design axis values that control the shapes or outlines of the glyphs in the digital text 300 based on the variable font.

In one or more embodiments, the custom font bounding box system 102 generates a sorted list of instances 310 based on a comparison between the design vector 306 of the custom instance 302 and the design vectors 308a-308n of the predefined instances 304a-304n. For example, the custom font bounding box system 102 determines a distance between the design vector 30 of the custom instance 302 and each of the design vectors 308a-308n of the predefined instances 304a-304n. According to one or more embodiments, the custom font bounding box system 102 normalizes the design vectors (e.g., by normalizing each design axis value in the design vectors) for all of the instances. Specifically, the custom font bounding box system 102 normalizes the design vectors because different design axes can have different possible range values. Normalizing the design vectors (e.g., from 0 to 1) provides a consistent measurement representation for all design axes.

In one or more embodiments, the custom font bounding box system 102 normalizes the design vectors as in Algorithm 3 below:

Algorithm 3 Get Normalized DV for all Named Instances

```
input : 'mFontDict' (FontDictionary of Variable Font), mNamedInstancesDVArray
output 'mNormalizedNamedInstanceDVArray' (Normalized DV array for all named instances )
:
mNumAxes = mFontDict.GetNumDesignAxes( );
  for each 'dv' from mNamedInstancesDVArray do
  |   std::vector<float> normalizedDv:
  |     axisIndex = 0;
  |   for axisIndex < mNumAxes; axisIndex++ do
  |   |   axisLimit = mFontDict.GetAxisLimit(axisIndex):
  |   |     normalizeValue = (dv[axisIndex] - axisLimit.lower) / (axisLimit.upper - axisLimit.lower):
  |   |     normalizedDv.insert(normalizeValue):
  |   end
  |   mNormalizedNamedInstanceDVArray.insert(normalizedDv):
end
```

The custom font bounding box system 102 then determines a difference between the normalized version of the design vector 306 of the custom instance 302 and the normalized version of the design vectors 308a-308n of the predefined instances 304a-304n. For example, the custom font bounding box system 102 calculates a Euclidean distance between the normalized version of the design vector 306 and each of the normalized versions of the design vectors 308a-308n. In one or more embodiments, the custom font bounding box system 102 generates the sorted list of instances 310 based on the Euclidean distance of the corresponding normalized versions of the design vectors 308a-308n of the predefined instances 304a-304n and the normalized version of the design vector 306 of the custom instance 302. For example, the custom font bounding box system 102 determines the Euclidean distances as in Algorithm 4 below:

Additionally, in one or more embodiments, the custom font bounding box system 102 determines that the custom instance 302 is between the first selected instance 312a and the second selected instance 312b (e.g., based on one or more individual design axis values in the design vectors).

In some embodiments, the custom font bounding box system 102 selects any number of instances depending on available resources and/or desired font bounding box accuracy for the digital text 300. Thus, FIG. 3 illustrates that the custom font bounding box system 102 optionally determines an nth selected instance 312n representing one or more additional instances from the sorted list of instances 310. To illustrate, the custom font bounding box system 102 selects up to four or five total instances from the predefined instances 304a-304n to generate a font bounding box for the digital text 300, though the number of selected instances may differ.

Algorithm 4 Euclidean distance computation between a custom-instance and all named-instances

```
input : mFontDict. mNormalizedNamedInstanceDVArray, normalizedCustomInstanceDv
output 'mEuclideanDistMap' (A sorted list of all euclidean distances)
:
mNumAxes = mFontDict.GetNumDesignAxes( );
  mNamedInstanceIndex = 0:
  for each 'normalizedDv' from mNormalizedNamedInstanceDVArray do
  |   axisIndex = 0;
  |     distance = 0;
  |   for axisIndex < mNumAxes; axisIndex++ do
  |   |   distance += pow(normalizedCustomInstanceDv[i] - normalizedDv[i], 2.0);
  |   end
  |   distance = sqr(distance);
  |   // Here, 'mEuclideanDistMap' is a sorted map where 'key' is the distance and 'value' is a pair for named-instance
  |     index and its corresponding normalizedDV,
  |   mEuclideanDistMap[distance] = MakePair(mNamedInstanceIndex, normalizedDv);
  |   mNamedInstanceIndex ++;
end
return sorted mEuclideanDistMap;
```

After generating the sorted list of instances 310, FIG. 3 illustrates that the custom font bounding box system 102 selects a plurality of instances from the sorted list of instances 310. For instance, the custom font bounding box system 102 selects a plurality of instances highest in the sorted list of instances 310. In one or more embodiments, the sorted list of instances 310 ranks the predefined instances 304a-304n according to Euclidean distance from the custom instance 302 such that the closest instances are higher on the list. Accordingly, a first selected instance 312a is a highest ranked instance in the sorted list of instances 310 as the closest instance to the custom instance 302, and a second selected instance 312b is a second highest ranked instance as the second-closest instance to the custom instance 302.

In response to selecting a plurality of instances (e.g., the first selected instance 312a and the second selected instance 312b), the custom font bounding box system 102 determines glyph sets for the selected instances. Specifically, the custom font bounding box system 102 processes the selected instances for the digital text 300 to determine glyphs (e.g., and corresponding glyph bounding boxes) that contribute to font bounding boxes for the selected instances. For instance, the custom font bounding box system 102 determines a first glyph set 314a based on a font bounding box and glyph bounding boxes for the first selected instance 312a and a second glyph set 314b based on a font bounding box and glyph bounding boxes for the second selected instance 312b. In embodiments including additional selected instances, the custom font bounding box system 102 determines an additional glyph set (e.g., an nth glyph set 314n) based on a font bounding box and glyph bounding boxes for the additional selected instance (e.g., the nth selected instance 312n). In one or more embodiments, the custom font bounding box system 102 determines the glyph sets for each selected instance as in Algorithm 2 below:

union glyph set 316. Accordingly, the union glyph set 316 includes all glyphs having glyph bounding boxes that contribute to the respective font bounding boxes of the selected instances. In some embodiments, the glyphs of the separate glyph sets overlap (e.g., a single glyph contributes to the font bounding box for more than one selected instance), while in other embodiments, the glyphs of the separate glyph sets do

---

Algorithm 2 Identification of Glyph Set contributing to compute font-bbox for each Named Instance

---

```
input : 'mFontDict' (FontDictonary of Variable Font), 'mNamedInstancesDVArray'
output 'mCachedGlyphSetArray' (A list of glyphs contributing to font-bbox computation for each Named Instance)
:
mNumGlyphs ← mFontDict.GetNumGlyphsInAFont( );
  namedInstanceIndex = 0;
  invalidBBox = [MAXFLOAT, MAXFLOAT, MINFLOAT, MINFLOAT];
  for each 'dv' from mNamedInstancesDVArray do
  |  maxNamedInstanceBBox = invalidBBox; // Initialize with invalid bbox.
  |  for glyphIndex = 0; glyphIndex < mNumGlyphs; glyphIndex++ do
  |  |  glyphBbox = mFontDict.GetBBox(glyphIndex , dv);
  |  |    if(glyphBbox.xMin == 0 && glyphBbox.yMin == 0 && glyphBbox.xMax == 0 && glyphBbox.yMax == 0)
  |  |      continue;
  |  |    if (glyphBbox.xMin <= maxNamedInstanceBBox.xMin)
  |  |      maxNamedInstanceBBox.xMin = glyphBbox.xMin;
  |  |    if (glyphBbox.yMin <= maxNamedInstanceBBox.yMin)
  |  |      maxNamedInstanceBBox.yMin = glyphBbox.yMin;
  |  |    if (glyphBbox.xMax >= maxNamedInstanceBBox.xMax)
  |  |      maxNamedInstanceBBox.xMax = glyphBbox.xMax;
  |  |    if (glyphBbox.yMax >= maxNamedInstanceBBox.yMax)
  |  |      maxNamedInstanceBBox.yMax = glyphBbox.yMax;
  |  |
  |  end
  |  // Now, we have found maxNamedInstaneBBox for curent Named Instance,
  |   // next, we find the set of glyphs contributing to maxNamedInstanceBBox.
  |    std::set<int> currentNamedInstGlyphSet;
  |  for glyphIndex = 0; glyphIndex < mNumGlyphs; glyphIndex++ do
  |  |  glyphBbox = mFontDict.GetBBox(glyphIndex, dv);
  |  |    if (glyphBbox.xMin = 0 && glyphBbox.yMin == 0 && glyphBbox.xMax == 0 && glyphBbox.yMax ==
  |  |    0) continue;
  |  |    if (glyphBbox.xMin <= maxNamedInstanceBBox.xMin)
  |  |    currentNamedInstGlyphSet.Insert(glyphIndex);
  |  |    if (glyphBbox.yMin <= maxNamedInstanceBBox.yMin)
  |  |    currentNamedInstGlyphSet.insert(glyphIndex);
  |  |    if (glyphBbox.xMax >= maxNamedInstanceBBox.x.Max)
  |  |    currentNamedInstGlyphSet.insert(glyphIndex);
  |  |    if (glyphBbox.yMax >= maxNamedInstanceBBox.yMax)
  |  |    currentNamedInstGlyphSet.insert(glyphIndex);
  |  |
  |  |    mCachedGlyphSetArray[namedInstanceIndex++] = currentNamedInstGlyphSet:
  |  |    // Clear the glyph set for current named instance.
  |  |      currentNamedInstGlyphSet.clear( );
  |  end
  end
```

---

Additionally, FIG. 3 illustrates that the custom font bounding box system 102 also determines a union glyph set 316 from the individual glyph sets of the selected instances. In particular, the custom font bounding box system 102 combines the first glyph set 314a and the second glyph set 314b (and optionally the nth glyph set 314n) to generate the not overlap. In one or more embodiments, the custom font bounding box system 102 also caches the union glyph set 316 for later use in customizing font bounding boxes for custom instances of the digital text 300. For example, the custom font bounding box system 102 determines the union glyph set 316 according to Algorithm 5 below:

Algorithm 5 Fetch glyph-set to use to compute font bbox for custom instance input : mFontDict, mEuclideanDistMap, mCachedGlyphSet, mMaxRequiredNamedInstances
output 'mGlyphSetToUseToComputeBBox' (A unique set of glyphs to compute bbox for custom instance)
:
mNumAxes = mFontDict.GetNumDesignAxes( );
  requiredNamedInstances = 0;
  std::set<.int> glyphsToUseToComputeBBox;
for each 'distanceMapValue' from mEuclideanDistMap do
|  if requiredNamedInstances < mMaxRequiredNamedInstances then
| |    namedInstIndex = distanceMapValue.second.first:
| |     glyphSet = mCachedGlyphSet[namedInstIndex];
| |
| |    for each 'glyphIndex' from glyphSet do
| | |    mGlyphSetToUseToComputeBBox.insert(glyphIndex);
| |    end
| |    requiredNamedInstances++;
|  else
| |    break;
|  end
end
return mGlyphSetToUseToComputeBBox;

After determining the union glyph set 316 for the selected instances, the custom font bounding box system 102 generates a custom font bounding box 318 for the digital text 300. For example, the custom font bounding box system 102 determines glyph bounding boxes for glyphs of the union glyph set 316 at custom values of one or more design axes from the design vector 306 of the custom instance 302. The custom font bounding box system 102 then generates the custom font bounding box 318 based on the glyph bounding boxes of the glyphs from the union glyph set 316. By determining the custom font bounding box 318 based only on the glyph bounding boxes of glyphs in the union glyph set 316, rather than based on glyph bounding boxes for all of the glyphs in the digital text 300, the custom font bounding box system 102 more efficiently generates the custom font bounding box 318.

Figure 4:
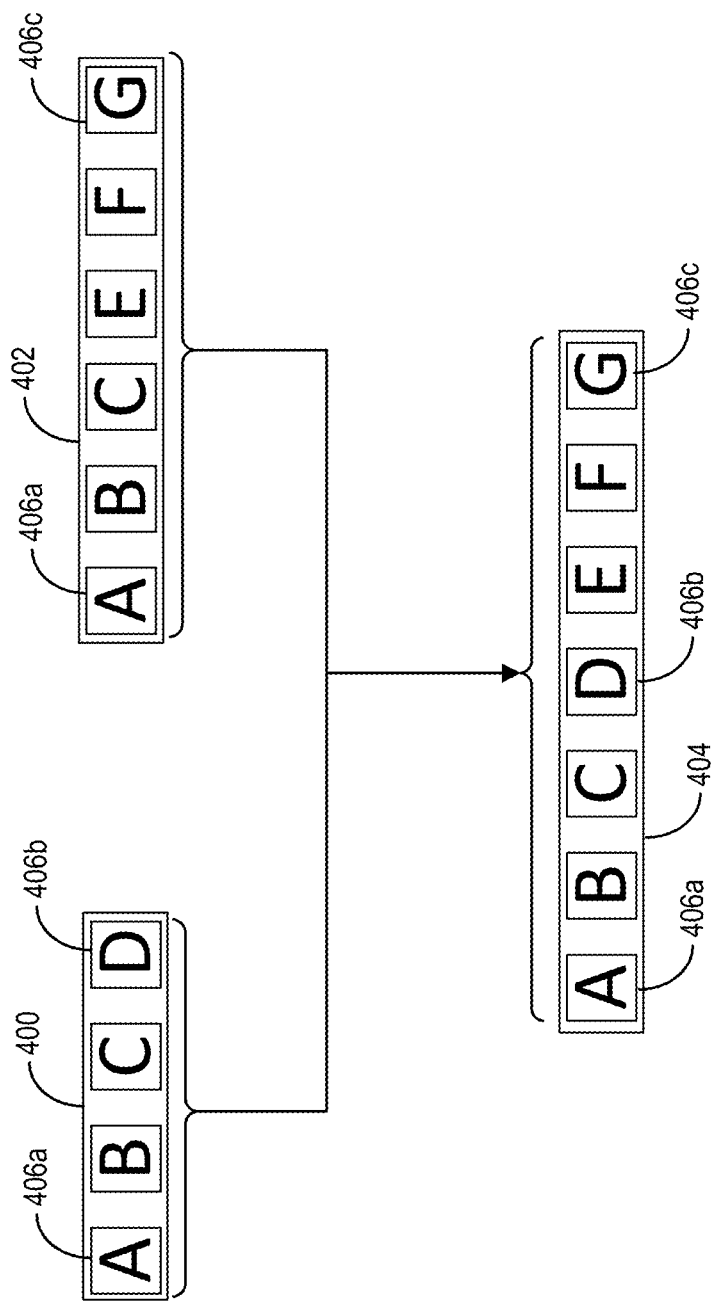
FIG. 4 illustrates a diagram of a union set of glyphs associated with a plurality of instances of a variable font in accordance with one or more implementations.

As mentioned, the custom font bounding box system 102 determines glyph sets for each selected instance to use in determining glyphs to process in generating a custom font bounding box for a custom instance of digital text. FIG. 4 illustrates that the custom font bounding box system 102 determines a plurality of sets of glyphs for different predetermined instances similar to a custom instance of digital text. FIG. 4 further illustrates utilizing the separate sets of glyphs to determine a final set of glyphs to use in generating a custom font bounding box for the custom instance of digital text.

In particular, FIG. 4 illustrates that the custom font bounding box system 102 determines a first glyph set 400 corresponding to a first predefined instance of digital text including a variable font. FIG. 4 also illustrates that the custom font bounding box system 102 determines a second glyph set 402 corresponding to a second predefined instance of the digital text including the variable font. Furthermore, FIG. 4 illustrates that the custom font bounding box system 102 determines a union glyph set 404 including glyphs from the first glyph set 400 and the second glyph set 402 to use in generating a custom font bounding box for a custom instance of the digital text including the variable font.

As illustrated in FIG. 4, the custom font bounding box system 102 generates the first glyph set 400 for a first predefined instance of digital text. In particular, the custom font bounding box system 102 utilizes one or more predefined values of one or more design axes of a variable font to process glyphs for the digital text. The custom font bounding box system 102 then determines glyph bounding boxes for each of the glyphs in the digital text at the predefined design axis value(s). Based on the glyph bounding boxes for the glyphs of the first predefined instance, the custom font bounding box system 102 also determines a font bounding box for the digital text in connection with the first predefined instance.

As shown, the first glyph set 400 includes a plurality of glyphs that have bounding boxes that contribute to a font bounding box for the first predefined instance. For example, the first glyph set 400 includes at least a first glyph 406a (i.e., "A") and a second glyph 406b (i.e., "D"). More specifically, each of the glyphs in the first glyph set 400 has a glyph bounding box that contributes to a minimum or a maximum value of the font bounding box for the first predefined instance along a first axis (e.g., x-axis), a second axis (e.g., y-axis), or both the first axis and the second axis. Thus, in some embodiments, a glyph contributes to more than a single boundary (or edge) font bounding box. In one or more additional embodiments, more than one glyph contributes to a single boundary of the font bounding box.

As also illustrated in FIG. 4, in one or more embodiments, the custom font bounding box system 102 generates the second glyph set 402 for a second predefined instance of the digital text. For instance, the custom font bounding box system 102 processes all of the glyphs in the digital text at the predefined value(s) of the one or more design axes of the variable font to determine glyphs that contribute to the corresponding font bounding box. In particular, the custom font bounding box system 102 determines the glyph bounding boxes for the glyphs of the second predefined instance—which may be different than the glyph bounding boxes for the glyphs of the first predefined instance—to determine the glyphs that contribute to one or more minimum or maximum values of the font bounding box along the first and second axes.

As mentioned, the glyph sets for different predefined instances may overlap. To illustrate, the second glyph set 402 also includes the first glyph 406a. The second glyph set 402 of FIG. 4, however, does not include the second glyph 406b. Additionally, the second glyph set 402 includes a third glyph 406c (e.g., "G") that is not included in the first glyph set 400. Accordingly, the first glyph set 400 and the second glyph set 402 partially overlap. In other embodiments, glyph sets can overlap entirely (e.g., the sets are identical) or not overlap at all (e.g., the sets are unique), depending on the impact of each design axis value on the shapes of the glyphs for each predefined instance.

FIG. 4 illustrates that the custom font bounding box system 102 generates the union glyph set 404 from the first glyph set 400 and the second glyph set 402. Specifically, the custom font bounding box system 102 determines the union of the first glyph set 400 and the second glyph set 402 to identify all unique glyphs across the glyph sets. As shown, the union glyph set 404 includes all of the glyphs in the first glyph set 400 and all of the glyphs in the second glyph set 402, including the first glyph 406a, the second glyph 406b, and the third glyph 406c. In embodiments including additional selected instances, a union glyph set can include more glyphs than shown in the union glyph set 404 of FIG. 4.

FIG. 5 illustrates examples of modifications to glyphs within digital text in connection with one or more design axes of a variable font. In particular, FIG. 5 illustrates a plurality of instances of digital text formatted according to the variable font. For example, the instances each include a specific configuration of design axes associated with the variable font. For example, FIG. 5 includes a first instance 500a and a second instance 500b of the digital text for the variable font.

In one or more embodiments, as shown, modifying a design axis of a variable font for the digital text modifies a specific visual attribute of one or more of the glyphs. In particular, the variable font includes at least one design axis that modifies a plurality of contours within each glyph of the digital text. In some embodiments, the variable font also provides a plurality of design axes for modifying one or more sets of contours individually (e.g., according to each design axis) or in combination to achieve a large variety of different shapes for one or more of the glyphs.

In response to modifying a value of a design axis of the variable font, a digital editing system modifies a rendering of the digital text within a digital content item. Specifically, FIG. 5 illustrates that the first instance 500a includes a default instance of the variable font. The second instance 500b includes a modified instance of the variable font according to at least one modified design axis. To illustrate, the modified instance includes glyphs with significantly different shapes and sizes. For example, modifying the digital text utilizing a design axis can increase or decrease a size of one or more portions of one or more glyphs in the digital text.

FIG. 5 further illustrates an initial glyph 502a of the first instance 500a with default values of one or more design axes of the variable font. By modifying the one or more design axes of the variable font to obtain the second instance 500b, the digital editing system also modifies the initial glyph 502a to obtain a modified glyph 502b within the second instance 500b. As shown, modifying the design axis significantly changed an outline (e.g., one or more contours) of the initial glyph 502a in the first instance 500a to obtain the modified glyph 502b in the second instance 500b. Additionally, modifying the one or more design axes also changes a size of the corresponding glyph (e.g., the modified glyph 502b is larger than the initial glyph 502a).

Based on the modifications to the glyphs in the digital text, the custom font bounding box system 102 determines new glyph bounding boxes for each of the glyphs. Specifically, FIG. 5 illustrates that a first glyph bounding box 504a for the initial glyph 502a is smaller than a second glyph bounding box 504b for the modified glyph 502b based on the increased size of the modified glyph 502b relative to the initial glyph 502a. The custom font bounding box system 102 then updates a font bounding box for the digital text. For instance, FIG. 5 illustrates a first font bounding box 506a for the first instance 500a and a second font bounding box 506b for the second instance 500b. To illustrate, the second font bounding box 506b covers a larger area than the first font bounding box 506a due to the increased size of the second glyph bounding box 504b relative to the first glyph bounding box 504a.

Figure 6A:
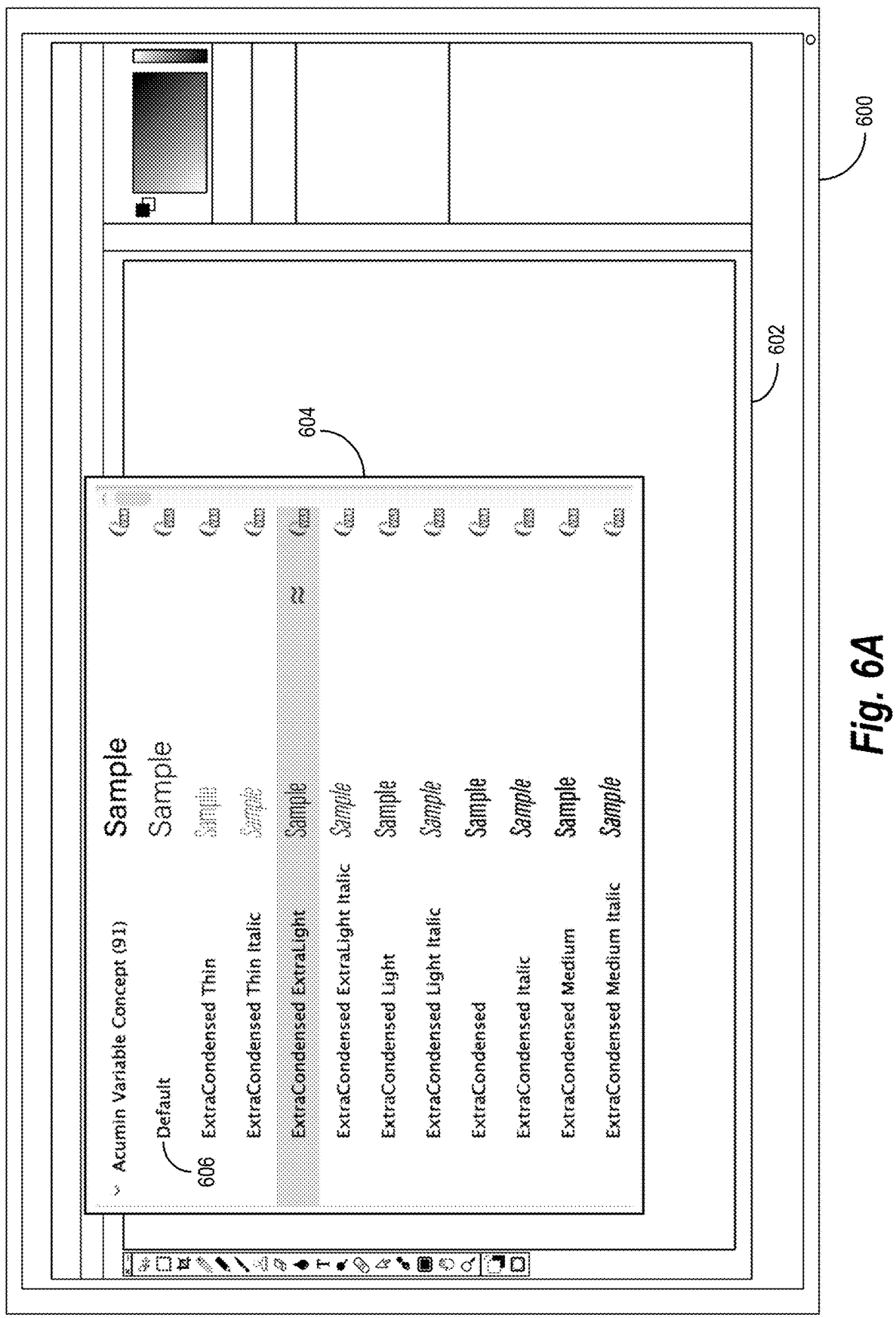
FIG. 6A illustrates a graphical user interface presenting a plurality of design axis instances of a variable font in accordance with one or more implementations.
Figure 6B:
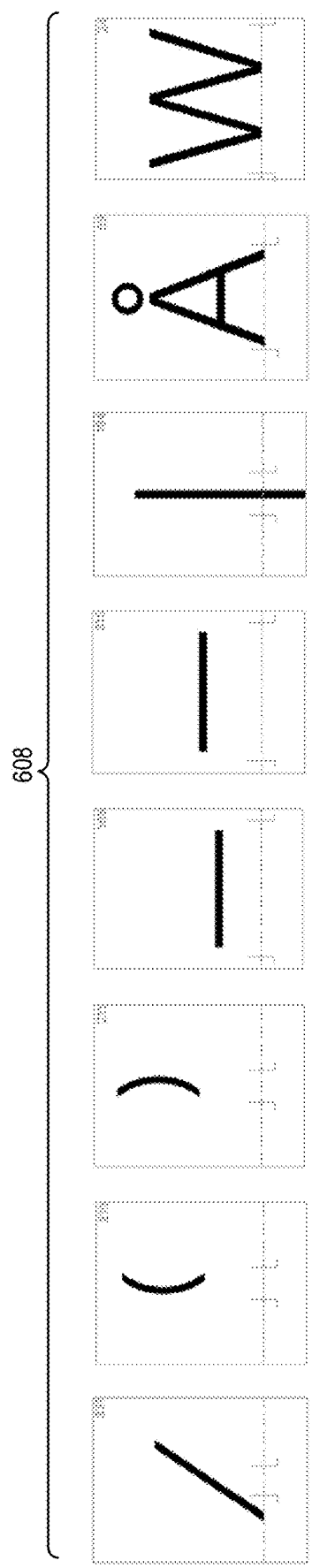
FIG. 6B illustrates a glyph set for a default design axis value of the variable font of FIG. 6A in accordance with one or more implementations.

As described previously, in one or more embodiments, the custom font bounding box system compares a custom instance of digital text including a variable font to a plurality of predefined instances of the variable font. For example, the custom font bounding box system 102 compares the custom instance to a plurality of master instances of the variable font. FIG. 6A illustrates a graphical user interface indicating a plurality of master instances of a variable font for rendering digital text. FIG. 6B illustrates a glyph set that contribute to a font bounding box for a default master instance of the variable font depicted in FIG. 6A.

In particular, FIG. 6A illustrates a client device 600 displaying a graphical user interface of a digital editing application 602. In one or more embodiments, the client device 600 provides tools within the digital editing application 602 for generating and editing digital content items including digital text. According to one or more embodiments, in connection with generating and editing digital text within digital content items, the client device 600 also provides a font selection dialog 604 within the digital editing application 602 including one or more fonts for applying to digital text in a digital content item. Additionally, the font selection dialog 604 includes one or more selectable master instances of a font (e.g., within a sub-menu) including, but not limited to, versions of the font including default, thin, italic, medium, and others, as shown. Some fonts can include a large number of master instances.

In response to selecting a master instance from the font selection dialog 604, in one or more embodiments, the client device 600 applies the selected font to digital text. For instance, in response to a selection of a default instance 606 of the variable font, the client device 600 applies the default instance 606 to digital text (e.g., to apply to new digital text or to apply to existing digital text). The client device 600 applies the selected master instance by formatting the digital text according to one or more visual attributes associated with the selected master instance. As an example, the client device 600 applies a weight value of 194, a width value of 100, and a slant value of 0 to the digital text according to the predefined design axis values of the default instance 606 of a particular variable font. To illustrate, the client device 600 sets one or more design axes of the variable font for the digital text to predefined values associated with the master instance.

In one or more embodiments, the client device 600 also provides tools for setting custom values of design axes of a variable font to generate a custom instance of the variable font for digital text. As an example, the custom values include a weight value of 149, a width value of 68, and a slant value of 2. As noted previously, the custom font bounding box system 102 utilizes the custom values of the custom instance and predefined values associated with a plurality of master instances of the variable font to generate a custom font bounding box for the custom instance. In particular, the custom font bounding box system 102 determines a set of glyphs that contribute to font bounding boxes of a plurality of similar master instances to use in determining the custom font bounding box.

Utilizing the custom values of the variable font above, in one example, the custom font bounding box system 102 determines a Euclidean distance between the normalized design vector of the custom instance and a first master instance (e.g., "Condensed Thin") as 0.177732 with a weight value of 100, a width value of 67.50, and a slant value of 0. Additionally, and the custom font bounding box system 102 determines a Euclidean distance between the normalized design vector of the custom instance and a second master instance (e.g., "Condensed ExtraLight") as 0.178609 with a weight value of 200, a width value of 67.50, and a slant value of 0. The custom font bounding box system 102 then determines that the custom instance is between the first and second master instances and determines the glyph sets for each of the two instances.

FIG. 6B illustrates a glyph set 608 including a plurality of glyphs associated with a master instance. Specifically, the glyph set 608 corresponds to the default instance 606 of the font in FIG. 6A and includes a plurality of glyphs that contribute to a font bounding box of the default instance 606. In one or more embodiments, the custom font bounding box system 102 determines the glyph set 608 for the master instance based on glyphs present in digital text formatted with the variable font within the digital content item.

According to one or more embodiments, the custom font bounding box system 102 obtains at least some data (e.g., font bounding box corner points) associated with the master instances font configuration data. For example, the custom font bounding box system 102 obtains the corner points of the font bounding box for a master instance from a head table for the instance. Additionally, the custom font bounding box system 102 iterates through glyphs of the instance to determine glyph bounding boxes using outline points for the glyphs. If corner points of the font bounding box match with a glyph, the custom font bounding box system 102 appends a glyph identifier to a list of contributing glyphs. After iterating through all glyphs of the instance, the custom font bounding box system obtains a limited set of glyphs that have glyph bounding boxes that contribute to at least one corner of the font bounding box.

In one or more alternative embodiments, as mentioned, the custom font bounding box system 102 also determines font bounding boxes for custom instances of variable fonts that do not have master instances. In particular, some variable fonts utilize axis variations tables that indicate variations along one or more design axes of the variable fonts. Accordingly, the custom font bounding box system 102 determines predefined instances that have specific configurations of design axes according to the axis variations tables. The custom font bounding box system 102 also determines glyph sets for such predefined instances to use in customizing font bounding boxes for custom instances.

Figure 7A:
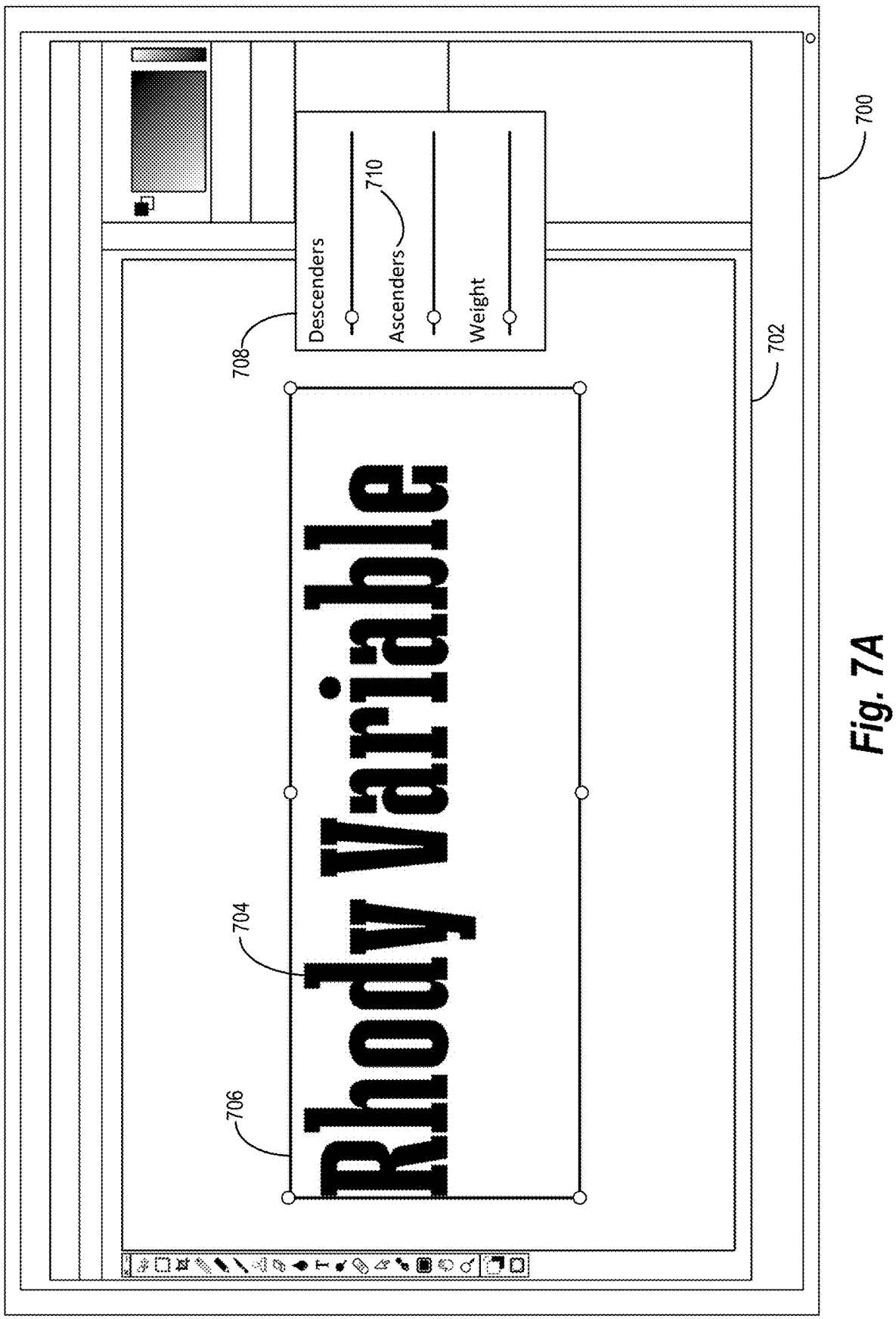
FIGS. 7A-7B illustrate graphical user interfaces presenting examples of digital text having various design axis values of a variable font in accordance with one or more implementations.
Figure 7B:
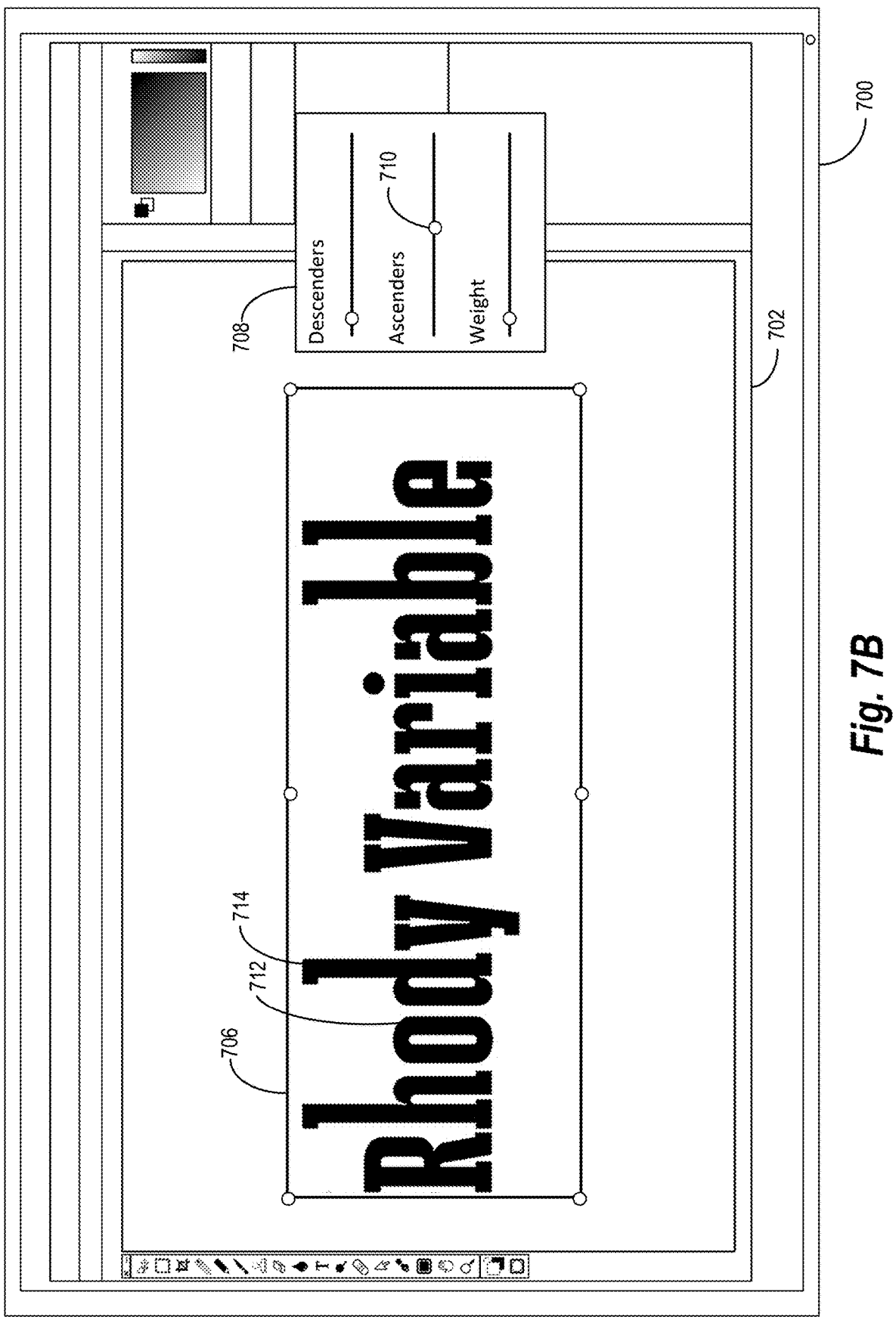

FIGS. 7A-7B illustrate graphical user interfaces for embodiments of different instances of a variable font for digital text. Specifically, FIG. 7A illustrates a first instance of the variable font associated with a first configuration of design axis values. FIG. 7B illustrates a second instance of the variable font associated with a second configuration of design axis values.

As illustrated in FIG. 7A, a client device 700 displays a graphical user interface for a digital editing application 702 for generating and editing digital content items including digital text 704. Specifically, the digital text 704 is formatted utilizing a variable font associated with a plurality of adjustable visual attributes. FIG. 7A further illustrates that the digital text 704 is displayed within a text box 706 that determines a position of the digital text 704 within a digital content item.

Additionally, FIG. 7A illustrates that the variable font has a plurality of adjustable design axes that control the adjustable visual attributes. For example, the client device 700 displays a font customization dialog 708 that includes a plurality of interface elements for changing values of the design axes of the variable font. To illustrate, FIG. 7A illustrates that the font customization dialog 708 includes a slider element 710 for modifying a design axis associated with ascenders of digital text formatted with the variable font. In one or more embodiments, modifying a position of the slider element 710 modifies one or more ascenders of the digital text.

FIG. 7B illustrates modified digital text 712 according to a modified design axis for the variable font. In particular, in response to a modification of the position of the slider element 710 in the font customization dialog 708, the client device 700 modifies an ascender 714 of the modified digital text 712 (e.g., a portion of the text that extends above a mean line of the font). To illustrate increasing a value of an ascender design axis increases a length of the ascenders in the modified digital text 712. In one or more embodiments, the client device 700 provides updated digital text as the value of the corresponding design axis changes (e.g., by providing live render updates).

In response to modifying one or more design axes of the variable font, the custom font bounding box system 102 re-calculates a font bounding box for the digital text. Specifically, the custom font bounding box system 102 generates a first font bounding box for the digital text 704 in FIG. 7A and a second font bounding box for the modified digital text 712 in FIG. 7B. Updating the font bounding box for the digital text also modifies one or more additional properties of the digital text and/or the text box 706. For example, the client device 700 updates the position of the modified digital text 712 within the text box 706 based on the second font bounding box to maintain a position of the modified digital text 712 within the text box 706 (e.g., by preventing the ascenders with increased height extending beyond a boundary of the text box 706. In additional embodiments, the updated font bounding box also causes the client device 700 to change a size of a text cursor in the text box 706.

Figure 8:
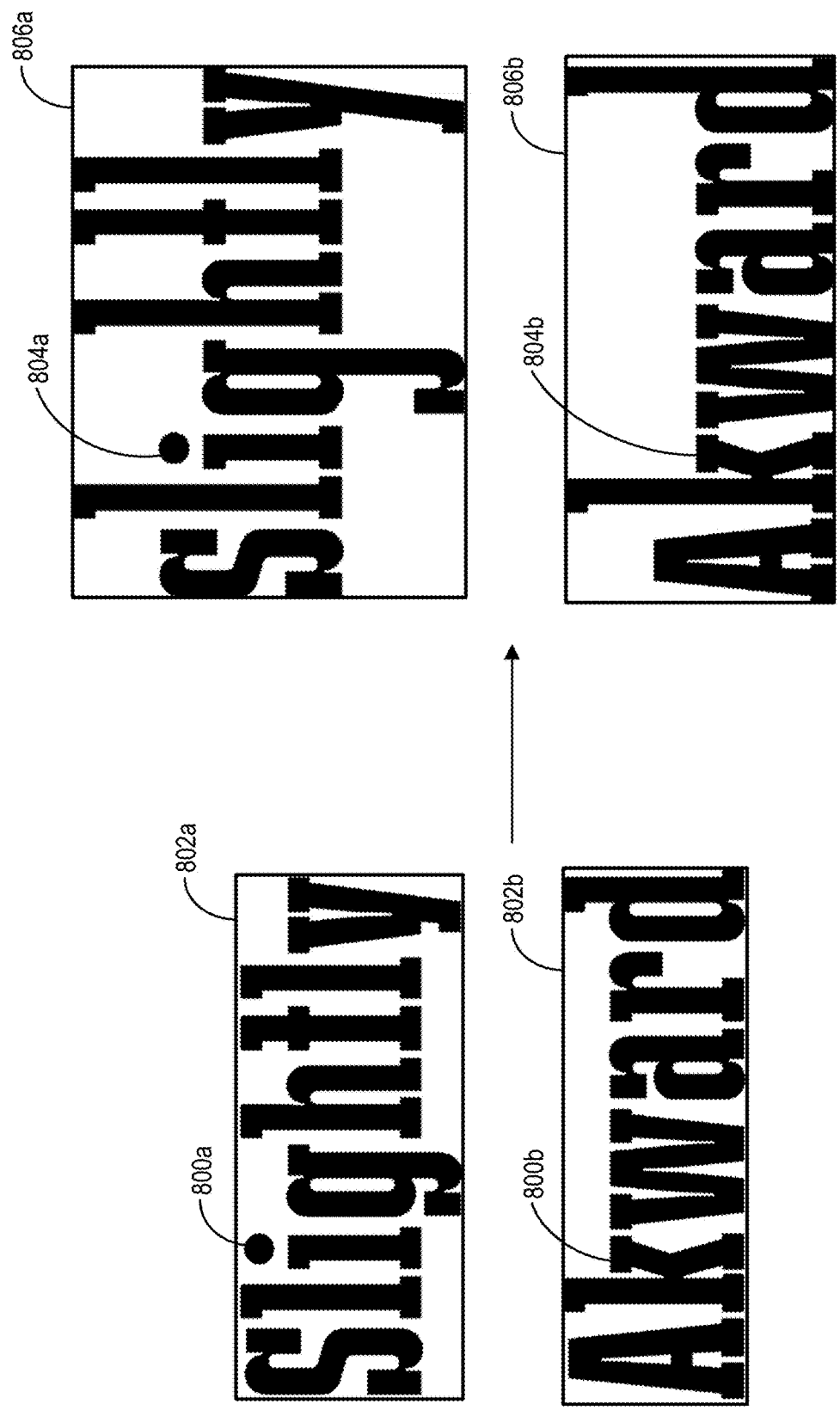
FIG. 8 illustrates an example of modified digital text based on custom font bounding boxes in accordance with one or more implementations.

In one or more embodiments, the custom font bounding box system 102 also modifies visual attributes and formatting of other digital text or digital content within a digital content item in response to modification to a font bounding box of digital text. For example, FIG. 8 illustrates examples of updated text lines for adjacent lines of digital text based on updated font bounding boxes for the digital text. In particular, FIG. 8 illustrates a first text line 800a and a second text line 800b of digital text at a first configuration for a variable font. More specifically, the custom font bounding box system 102 generates a first font bounding box 802a for the first text line 800a and a second font bounding box 802b for the second text line 800b based on the design axis values for the respective text lines. According to one or more embodiments, the custom font bounding box system 102 (or a digital editing system) renders the first text line 800a and the second text line 800b at positions based on the first font bounding box 802a and the second font bounding box 802b.

As illustrated in FIG. 8, in response to a request to modify one or more design axes of the variable font, the digital editing system or client device generates modified digital text including an updated first text line 804a and an updated second text line 804*b* with the modified font attributes. FIG. 8 further illustrates that the custom font bounding box system 102 generates an updated first font bounding box 806*a* and an updated second font bounding box 806*b* for the updated first text line 804*a* and the updated second text line 804*b*, respectively. Additionally, in connection with updating the font bounding boxes, the custom font bounding box system 102 also updates the positions of the text lines to prevent overlapping text. In some embodiments, the custom font bounding box system 102 also maintains a specific distance between the text lines and shifts the one or more of the text lines accordingly.

Figure 9:
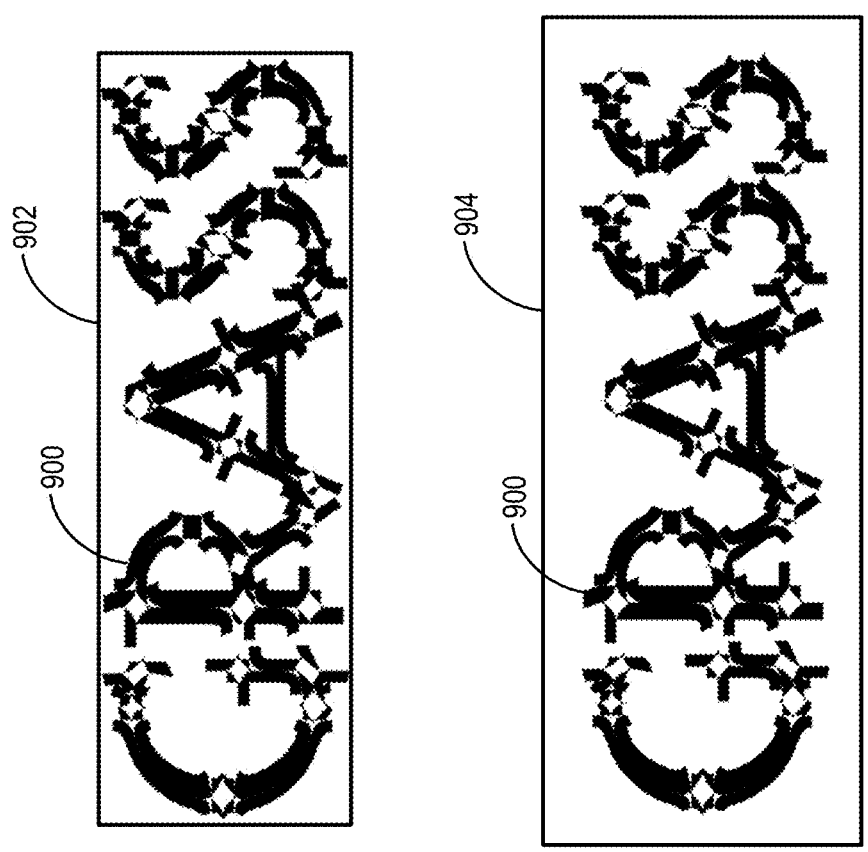
FIG. 9 illustrates examples of custom font bounding boxes for digital text in accordance with one or more implementations.

As mentioned, the custom font bounding box system 102 also provides customizability of font bounding boxes. For example, FIG. 9 illustrates examples of different configurations of font bounding boxes for digital text 900 including a variable font. In one or more embodiments, the custom font bounding box system 102 generates a first font bounding box 902 configured to fit to the digital text 900. In particular, the custom font bounding box system 102 determines the first font bounding box 902 to fit exactly to coordinates based on a cached set of glyphs corresponding to similar predefined instances of the variable font. To illustrate, the custom font bounding box system 102 determines a minimum x-value, a minimum y-value, a maximum x-value, and a maximum y-value based on the cached set of glyphs and determines corner points of the font bounding box from the determined values.

FIG. 9 also illustrates a second font bounding box 904 for the digital text 900 according to a different configuration. For instance, the custom font bounding box system 102 determines a loose (overfitted) font bounding box that encloses the digital text 900 while also providing a small buffer between the outlines of the glyphs and the second font bounding box 904. To illustrate, the custom font bounding box system 102 determines a tight font bounding box based on the union glyph set and then uses a delta value for the corner points to make the font bounding box larger. In one or more embodiments, the custom font bounding box system 102 determines the minimum and maximum values for the font bounding box and then adds the delta value to (or subtracts the delta value from) the minimum and maximum values to determine the corner points of the second font bounding box. In some embodiments, the custom font bounding box system 102 utilizes a fixed value (e.g., a specific distance or number of pixels) or a dynamic value (e.g., a percentage relative to the font bounding box size).

Figure 10:
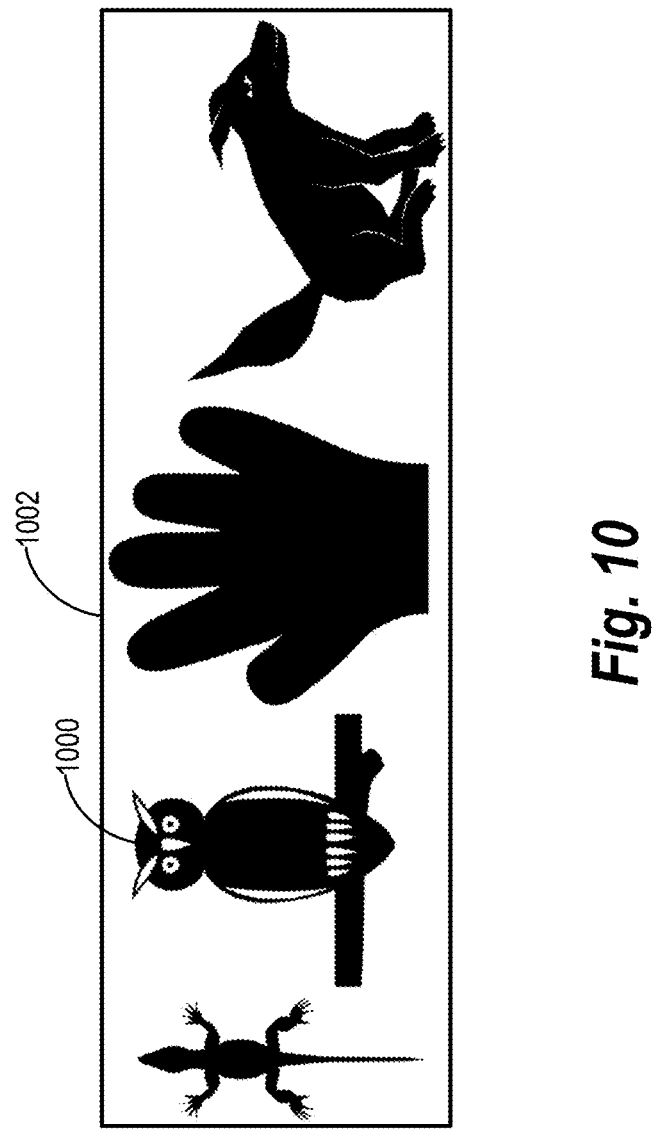
FIG. 10 illustrates an embodiment of a custom font bounding box for non-alphabetic glyphs in accordance with one or more implementations.

FIG. 10 illustrates that the custom font bounding box system 102 also provides customized font bounding boxes for digital text including non-alphanumeric glyphs. Specifically, FIG. 10 illustrates digital text including pictographic glyphs (e.g., a first pictographic glyph 1000). As illustrated in FIG. 10, the custom font bounding box system 102 generates a custom font bounding box 1002 according to glyph bounding box information for glyphs of similar predefined instances. Because the custom font bounding box system 102 determines the custom font bounding box system 102 based on glyphs of similar predefined instances, the custom font bounding box system 102 generates accurate font bounding boxes for such glyphs.

As previously described, the custom font bounding box system 102 improves the efficiency of computing systems that implement digital typography. The Table below indicates a comparison of the computing time to generate a font bounding box for the custom font bounding box system 102 and existing systems that iterate through all glyphs in a particular custom instance of a variable font to determine a font bounding box. As shown, the custom font bounding box system 102 provides significant improvement over the existing systems. Specifically, the table indicates the minimum and maximum values of the font bounding box along two axes ("xMin," "yMin," "xMax," "yMax").

| | Total Time Taken | | Percentage |
|---|---|---|---|
| Font Bounding Box (At Matrix 1000) | Iterating all glyphs | Iterating cached glyphs | Time Improvement |
| xMin: −144 yMin: −263 xMax: 653 yMax: 868 | ~28.723915 ms | ~0.644946 ms | ~98% |

Figure 11:
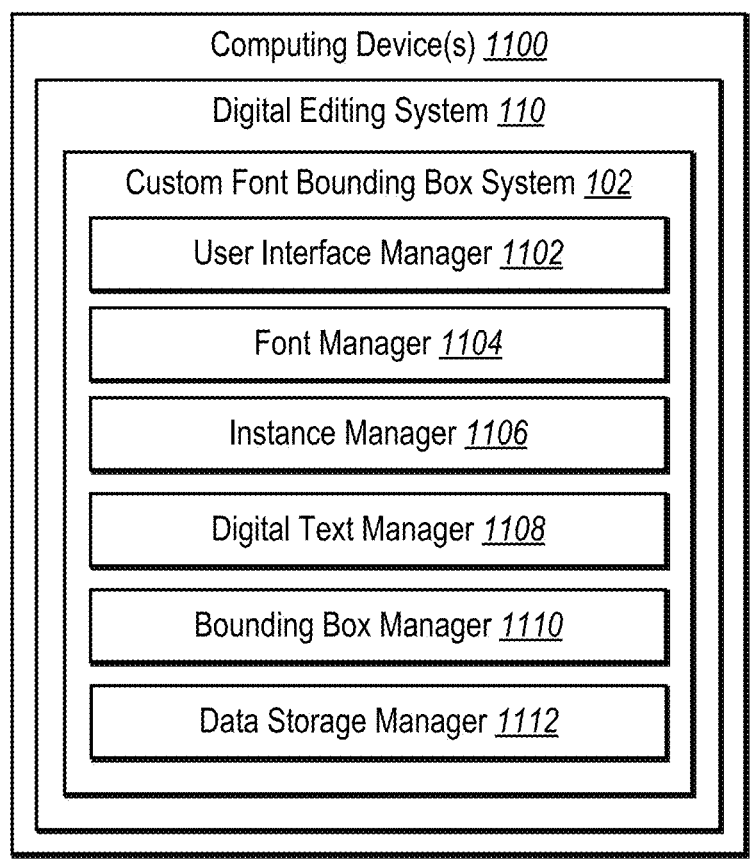
FIG. 11 illustrates a diagram of the custom font bounding box system of FIG. 1 in accordance with one or more implementations.

FIG. 11 illustrates a detailed schematic diagram of an embodiment of the custom font bounding box system 102 described above. As shown, the custom font bounding box system 102 is implemented in a digital editing system 110 on computing device(s) 1100 (e.g., a client device and/or server device as described in FIG. 1, and as further described below in relation to FIG. 13). Additionally, in one or more embodiments, the custom font bounding box system 102 includes, but is not limited to, a user interface manager 1102, a font manager 1104, an instance manager 1106, a digital text manager 1108, a bounding box manager 1110, and a data storage manager 1112. The custom font bounding box system 102 can be implemented on any number of computing devices. In one or more embodiments, the custom font bounding box system 102 is implemented in a distributed system of server devices for digital content editing. In alternative embodiments, the custom font bounding box system 102 is implemented within one or more additional systems. Alternatively, the custom font bounding box system 102 may be implemented on a single computing device such as a single client device.

In one or more embodiments, each of the components of the custom font bounding box system 102 is in communication with other components using any suitable communication technologies. Additionally, in some embodiments, the components of the custom font bounding box system 102 are in communication with one or more other devices including other computing devices of a user, server devices (e.g., cloud storage devices), licensing servers, or other devices/systems. It will be recognized that although the components of the custom font bounding box system 102 are shown to be separate in FIG. 11, any of the subcomponents may be combined into fewer components, such as into a single component, or divided into more components as may serve a particular implementation. Furthermore, although the components of FIG. 11 are described in connection with the custom font bounding box system 102, in one or more embodiments, at least some of the components for performing operations in conjunction with the custom font bounding box system 102 described herein are implemented on other devices within the environment.

In some embodiments, the components of the custom font bounding box system 102 include software, hardware, or both. For example, the components of the custom font bounding box system 102 include one or more instructions stored on a computer-readable storage medium and executable by processors of one or more computing devices (e.g., the computing device(s) 1100). When executed by the one or more processors, the computer-executable instructions of the custom font bounding box system 102 can cause the computing device(s) 1100 to perform the font bounding box generation operations described herein. Alternatively, the components of the custom font bounding box system 102 can include hardware, such as a special purpose processing device to perform a certain function or group of functions. Additionally, or alternatively, the components of the custom font bounding box system 102 can include a combination of computer-executable instructions and hardware.

Furthermore, the components of the custom font bounding box system 102 performing the functions described herein with respect to the custom font bounding box system 102 may, for example, be implemented as part of a stand-alone application, as a module of an application, as a plug-in for applications, as a library function or functions that may be called by other applications, and/or as a cloud-computing model. Thus, the components of the custom font bounding box system 102 may be implemented as part of a stand-alone application on a personal computing device or a mobile device. Alternatively, or additionally, the components of the custom font bounding box system 102 may be implemented in any application that provides digital content editing, including, but not limited to ADOBE® PHOTOSHOP®, ILLUSTRATOR®, INDESIGN®, ACROBAT® or CREATIVE CLOUD® software. "ADOBE", "PHOTOSHOP," "ILLUSTRATOR," "INDESIGN," "ACROBAT," AND "CREATIVE CLOUD" are either registered trademarks or trademarks of Adobe Inc. in the United States and/or other countries.

As described above, in some embodiments, the custom font bounding box system 102 includes a user interface manager 1102. For example, the user interface manager 1102 manages interactions with the custom font bounding box system 102 via one or more graphical user interfaces of one or more client devices. To illustrate, the user interface manager 1102 manages requests to modify attributes of digital text.

The custom font bounding box system 102 also includes a font manager 1104 to manage fonts in digital editing applications. For instance, the font manager 1104 obtains font information associated with variable fonts of digital text within a digital content item. To illustrate, the font manager 1104 obtains design axis data (e.g., attributes of digital text modified by one or more design axes) for variable fonts in connection with digital text in a digital content item.

Additionally, the custom font bounding box system 102 includes an instance manager 1106 to manage instances of digital text including variable fonts. Specifically, the instance manager 1106 manages data for a plurality of master instances associated with a variable font. Additionally, the instance manager 1106 manages data for a plurality of predefined instances associated with an axis variations table of a variable font. The instance manager 1106 further manages data for custom instances of digital text including a variable font.

In one or more embodiments, the custom font bounding box system 102 includes a digital text manager 1108 to manage data associated with digital text in digital content items. For example, the digital text manager 1108 stores information associated with each glyph in digital text, such as glyph sizes and positions. The digital text manager 1108 also stores data associated with text lines of digital text. The digital text manager 1108 further stores position data associated with digital text within a digital content item.

Additionally, the custom font bounding box system 102 includes a bounding box manager 1110 that manages bounding box information for digital text. Specifically, the bounding box manager 1110 generates and stores information for glyph bounding boxes of glyphs in digital text for one or more instances of a variable font. The bounding box manager 1110 also generates and stores information for font bounding boxes of digital text for the one or more instances of the variable font.

The custom font bounding box system 102 also includes a data storage manager 1112 (that comprises a non-transitory computer memory/one or more memory devices) that stores and maintains data associated with processing digital text in digital content items. For example, the data storage manager 1112 stores digital text and data associated with generating bounding boxes for the digital text. To illustrate, the data storage manager 1112 stores information associated with values of one or more design axes for one or more instances of a variable font (e.g., custom instances, master instances, predefined instances based on an axis variations table). The data storage manager 1112 also stores bounding box information such as glyph bounding boxes and font bounding boxes.

Figure 12:
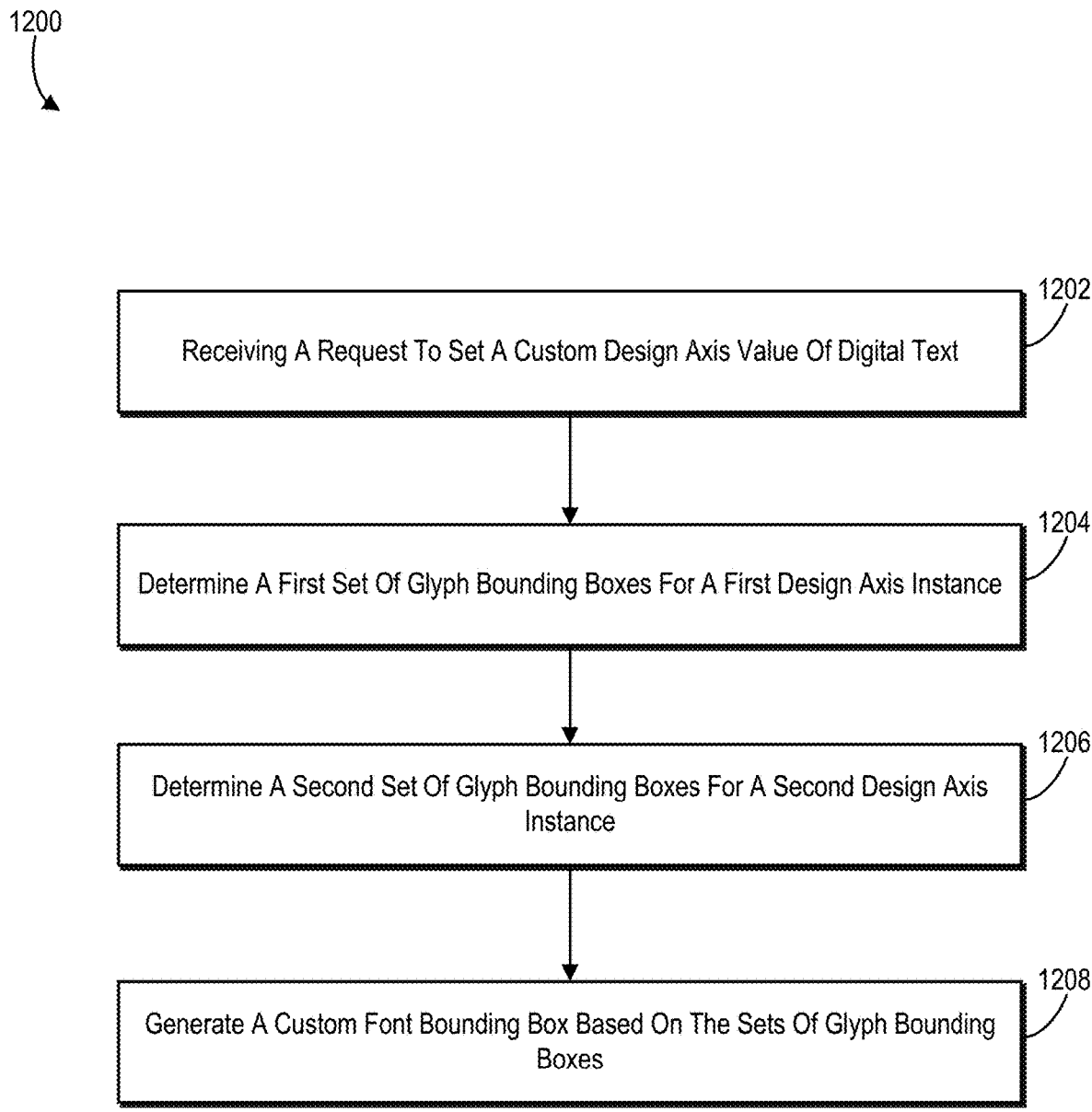
FIG. 12 illustrates a flowchart of a series of acts for customizing font bounding boxes for variable fonts utilizing glyph sets of pre-defined instances of the variable fonts in accordance with one or more implementations.

Turning now to FIG. 12, this figure shows a flowchart of a series of acts 1200 of generating custom font bounding boxes for digital text including a variable font based on glyph sets of a plurality of predefined instances of the variable font. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12.

As shown, the series of acts 1200 includes an act 1202 of receiving a request to set a custom design axis value of digital text. For example, act 1202 involves receiving a request to set a custom value of a design axis of digital text comprising a variable font in a digital content item. For instance, act 1202 can involve receiving a request to change the design axis for the digital text form an initial value to the custom value. Act 1202 can also involve receiving a request to set a plurality of custom values for a plurality of design axes of the digital text.

Additionally, the series of acts 1200 includes an act 1204 of determining a first set of glyph bounding boxes for a first design axis instance. For example, act 1204 involves determining, for a first design axis instance of the digital text, a first set of glyph bounding boxes that contribute to a first font bounding box for the digital text. Act 1204 can involve determining the first design axis instance of the digital text at a first value of the design axis. For instance, act 1204 can involve determining glyph bounding boxes for glyphs of the digital text comprising corner points at minimum boundary values or maximum boundary values of the first font bounding box.

The series of acts 1200 further includes an act 1206 of determining a second set of glyph bounding boxes for a second design axis instance. For example, act 1206 involves determining, for a second design axis instance of the digital text, a second set of glyph bounding boxes that contribute to a second font bounding box for the digital text. Act 1206 can involve determining the second design axis instance of the digital text at a second value of the design axis, wherein the custom value is between the first value and the second value. Act 1206 can also involve determining glyph bounding boxes for the glyphs of the digital text comprising corner points at minimum boundary values or maximum boundary values of the second font bounding box.

In one or more embodiments, the series of acts 1200 includes segmenting the design axis into a plurality of segments according to an axis variations table associated with the variable font. Furthermore, the series of acts 1200 can include determining a plurality of design axis instances of the digital text at an upper limit value of the design axis, a lower limit value of the design axis, and a plurality of values of the design axis indicated in the axis variations table.

In additional embodiments, the series of acts 1200 includes determining a plurality of master instances of the digital text comprising predetermined values of the design axis, the plurality of master instances comprising a first master instance corresponding to a first predetermined value of the design axis and a second master instance corresponding to a second predetermined value of the design axis instance. Accordingly, act 1204 can involve determining the first design axis instance of the digital text as a first master instance of the digital text comprising a first predetermined value of the design axis. Act 1206 can also involve determining the second design axis instance of the digital text as a second master instance of the digital text comprising a second predetermined value of the design axis.

In one or more embodiments, the series of acts 1200 includes generating a first normalized design axis value for the first design axis instance. The series of acts 1200 can also include generating a second normalized design axis value for the second design axis instance. The series of acts 1200 can include generating a normalized custom value from the custom value of the request. Additionally, the series of acts 1200 can include selecting the first design axis instance and the second design axis instance by comparing the normalized custom value to the first normalized design axis value and the second normalized design axis value.

For example, selecting the first design axis instance and the second design axis instance by sorting a plurality of instances of the variable font for the digital text corresponding to a plurality of predetermined values of the design axis according to Euclidean distances between the normalized custom value and each of a plurality of corresponding normalized design axis values. The series of acts 1200 can then include determining that the first normalized design axis value of the first design axis instance and the second normalized design axis value of the second design axis instance are closest to the normalized custom value. The series of acts 1200 can also include sorting the plurality of instances of the variable font for the digital text according to the Euclidean distances. Accordingly, the series of acts 1200 can include selecting the first design axis instance based on a first Euclidean distance between the custom normalized design vector and a first normalized design vector for the first design axis instance. The series of acts 1200 can include selecting the second design axis instance based on a second Euclidean distance between the custom normalized design vector and a second normalized design vector for the second design axis instance.

The series of acts 1200 also includes an act 1208 of generating a custom font bounding box based on the sets of glyph bounding boxes. For example, act 1208 involves generating, for the digital text at the custom value of the design axis, a custom font bounding box based on the first set of glyph bounding boxes of the first font bounding box and the second set of glyph bounding boxes of the second font bounding box. Act 1208 can involve generating a union set of glyph bounding boxes by determining a union of the first set of glyph bounding boxes and the second set of glyph bounding boxes. For example, act 1208 can involve generating a union set of glyph bounding boxes comprising glyph bounding boxes in the first set of glyph bounding boxes and glyph bounding boxes in the second set of glyph bounding boxes. Furthermore, act 1208 can involve generating the custom font bounding box based on the union set of glyph bounding boxes. To illustrate act 1208 can involve generating the custom font bounding box based on size dimensions of glyph bounding boxes from the union set of glyph bounding boxes.

Act 1208 can involve determining, based on size dimensions of a plurality of glyph bounding boxes in the union set of glyph bounding boxes, minimum values and maximum values along a first coordinate axis and a second coordinate axis. Act 1208 can then involve generating the custom font bounding box from the minimum values and the maximum values along the first coordinate axis and the second coordinate axis. For example, act 1208 can involve determining, utilizing the size dimensions of glyph bounding boxes from the union set of glyph bounding boxes, a first minimum value and a first maximum value along a first axis and a second minimum value and a second maximum value along a second axis. Act 1208 can thus involve generating the custom font bounding box comprising corner points based on the first minimum value, the second minimum value, the first maximum value, and the second maximum value.

In one or more embodiments, the series of acts 1200 includes determining a position of the digital text within the digital content item based on the custom font bounding box. The series of acts 1200 can further include modifying the position of the one or more glyphs of the digital text from a first position corresponding to an initial font bounding box to a second position corresponding to the custom font bounding box. Additionally, the series of acts 1200 can include modifying a position of the digital text relative to other digital content within the digital content item.

According to one or more embodiments, the series of acts 1200 includes receiving a request to update the design axis of the digital text to a new custom value. The series of acts 1200 can include determining, utilizing the new custom value, one or more additional master instances of the digital text corresponding to one or more additional predetermined values of the design axis. The series of acts 1200 can also include determining one or more additional sets of glyph bounding boxes comprising one or more additional size dimensions that contribute to one or more additional font bounding boxes for the digital text. The series of acts 1200 can then include generating an updated custom font bounding box for the digital text based on the one or more additional sets of glyph bounding boxes. The series of acts 1200 can also include modifying the digital text within the digital content item utilizing the updated custom font bounding box.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 13:
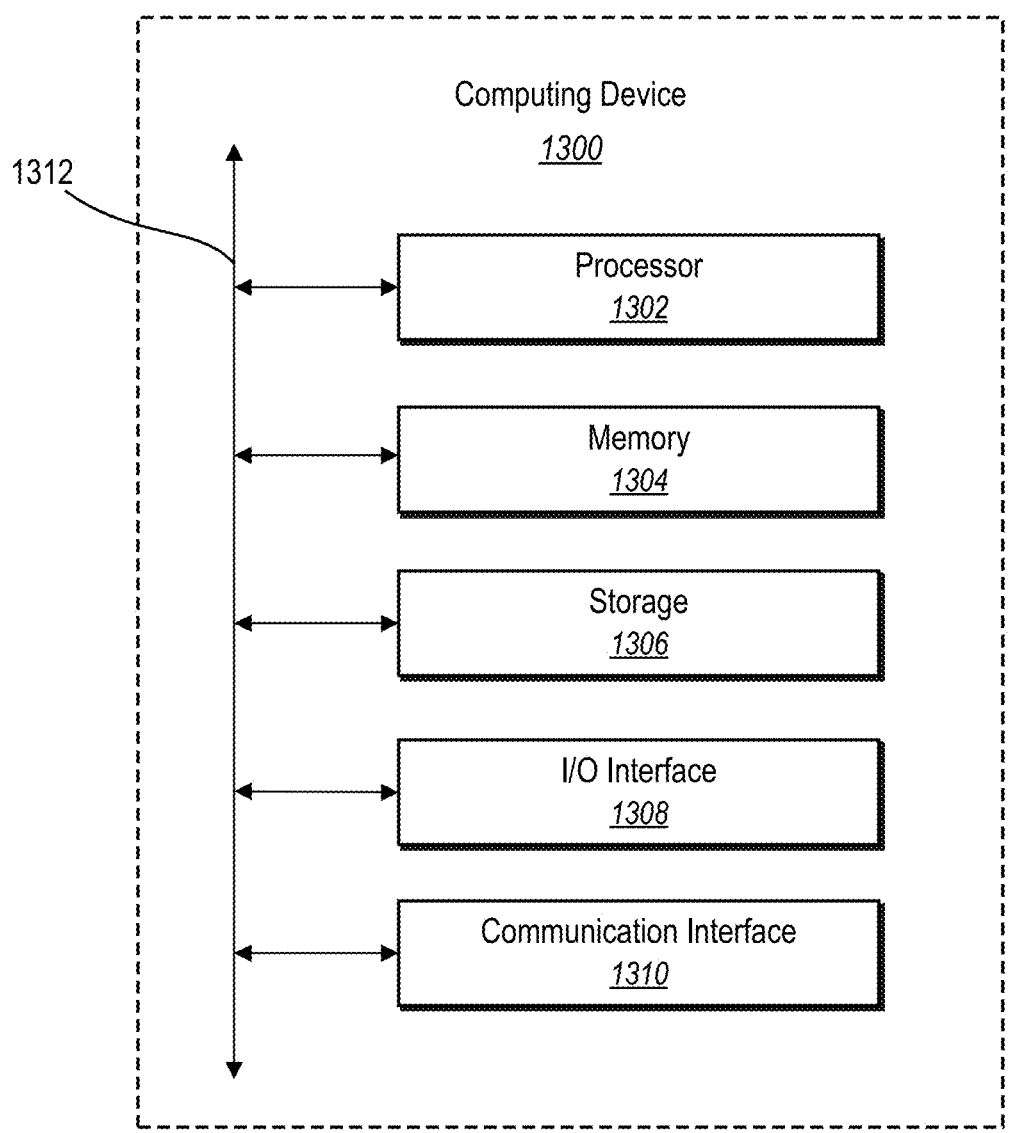
FIG. 13 illustrates a block diagram of an exemplary computing device in accordance with one or more embodiments.

FIG. 13 illustrates a block diagram of exemplary computing device 1300 that may be configured to perform one or more of the processes described above. One will appreciate that one or more computing devices such as the computing device 1300 may implement the system(s) of FIG. 1. As shown by FIG. 13, the computing device 1300 can comprise a processor 1302, a memory 1304, a storage device 1306, an I/O interface 1308, and a communication interface 1310, which may be communicatively coupled by way of a communication infrastructure 1312. In certain embodiments, the computing device 1300 can include fewer or more components than those shown in FIG. 13. Components of the computing device 1300 shown in FIG. 13 will now be described in additional detail.

In one or more embodiments, the processor 1302 includes hardware for executing instructions, such as those making up a computer program. As an example, and not by way of limitation, to execute instructions for dynamically modifying workflows, the processor 1302 may retrieve (or fetch) the instructions from an internal register, an internal cache, the memory 1304, or the storage device 1306 and decode and execute them. The memory 1304 may be a volatile or non-volatile memory used for storing data, metadata, and programs for execution by the processor(s). The storage device 1306 includes storage, such as a hard disk, flash disk drive, or other digital storage device, for storing data or instructions for performing the methods described herein.

The I/O interface 1308 allows a user to provide input to, receive output from, and otherwise transfer data to and receive data from computing device 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the computing device 1300 and one or more other computing devices or networks. As an example, and not by way of limitation, the communication interface 1310 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1310 may facilitate communications with various types of wired or wireless networks. The communication interface 1310 may also facilitate communications using various communication protocols. The communication infrastructure 1312 may also include hardware, software, or both that couples components of the computing device 1300 to each other. For example, the communication interface 1310 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   receive a request to set a custom value of a design axis of digital text comprising a variable font in a digital content item, the variable font comprising one or more design axes that adjust one or more visual attributes of the digital text during rendering;
   determine, for a first design axis instance of the digital text, a first set of glyph bounding boxes enclosing glyphs of the variable font that contribute to a first font bounding box for the digital text;
   determine, for a second design axis instance of the digital text, a second set of glyph bounding boxes enclosing glyphs of the variable font that contribute to a second font bounding box for the digital text; and
   generate, for rendering the digital text at the custom value of the design axis, a custom font bounding box based on the first set of glyph bounding boxes of the first font bounding box and the second set of glyph bounding boxes of the second font bounding box.

2. The non-transitory computer readable storage medium as recited in claim 1, further comprising instructions that, when executed by at least one processor, cause the computing device to generate the custom font bounding box for the digital text by:
   generating a union set of glyph bounding boxes by determining a union of the first set of glyph bounding boxes and the second set of glyph bounding boxes; and
   generating the custom font bounding box based on the union set of glyph bounding boxes.

3. The non-transitory computer readable storage medium as recited in claim 2, further comprising instructions that, when executed by at least one processor, cause the computing device to generate the custom font bounding box based on the union set of glyph bounding boxes by:
   determining, based on size dimensions of a plurality of glyph bounding boxes in the union set of glyph bounding boxes, minimum values and maximum values along a first coordinate axis and a second coordinate axis; and
   generating the custom font bounding box from the minimum values and the maximum values along the first coordinate axis and the second coordinate axis.

4. The non-transitory computer readable storage medium as recited in claim 1, further comprising instructions that, when executed by at least one processor, cause the computing device to:
   determine the first design axis instance of the digital text at a first value of the design axis; and
   determine the second design axis instance of the digital text at a second value of the design axis, wherein the custom value is between the first value and the second value.

5. The non-transitory computer readable storage medium as recited in claim 4, further comprising instructions that, when executed by at least one processor, cause the computing device to:
   segment the design axis into a plurality of segments according to an axis variations table associated with the variable font; and determine a plurality of design axis instances of the digital text at an upper limit value of the design axis, a lower limit value of the design axis, and a plurality of values of the design axis indicated in the axis variations table.

6. The non-transitory computer readable storage medium as recited in claim 1, further comprising instructions that, when executed by at least one processor, cause the computing device to:

determine a plurality of master instances of the digital text comprising predetermined values of the design axis, the plurality of master instances comprising a first master instance corresponding to a first predetermined value of the design axis and a second master instance corresponding to a second predetermined value of the design axis;

determine the first design axis instance of the digital text as a first master instance of the digital text comprising a first predetermined value of the design axis; and determine the second design axis instance of the digital text as a second master instance of the digital text comprising a second predetermined value of the design axis.

7. The non-transitory computer readable storage medium as recited in claim 1, further comprising instructions that, when executed by at least one processor, cause the computing device to:

generate a first normalized design axis value for the first design axis instance;

generate a second normalized design axis value for the second design axis instance;

generate a normalized custom value from the custom value of the request; and select the first design axis instance and the second design axis instance by comparing the normalized custom value to the first normalized design axis value and the second normalized design axis value.

8. The non-transitory computer readable storage medium as recited in claim 7, further comprising instructions that, when executed by at least one processor, cause the computing device to select the first design axis instance and the second design axis instance by:

sorting a plurality of instances of the variable font for the digital text corresponding to a plurality of predetermined values of the design axis according to Euclidean distances between the normalized custom value and each of a plurality of corresponding normalized design axis values; and determining that the first normalized design axis value of the first design axis instance and the second normalized design axis value of the second design axis instance are closest to the normalized custom value.

9. The non-transitory computer readable storage medium as recited in claim 1, further comprising instructions that, when executed by at least one processor, cause the computing device to determine a position of the digital text within the digital content item based on the custom font bounding box.

10. A system comprising:
a memory device; and
one or more processors configured to cause the system to:
receive a request to set a custom value of a design axis for a custom instance of digital text comprising a variable font in a digital content item, the variable font comprising one or more design axes that adjust one or more visual attributes of the digital text during rendering;

determine, utilizing the custom value, a first master instance of the variable font corresponding to a first predetermined value of the design axis;

determine, for the first master instance, a first set of glyph bounding boxes enclosing glyphs of the variable font that contribute to a first font bounding box for the digital text;

determine, utilizing the custom value, a second master instance of the variable font corresponding to a second predetermined value of the design axis;

determine, for the second master instance, a second set of glyph bounding boxes enclosing glyphs of the variable font that contribute to a second font bounding box for the digital text; and generate, for rendering the custom instance of the digital text, a custom font bounding box based on the first set of glyph bounding boxes of the first font bounding box and the second set of glyph bounding boxes of the second font bounding box.

11. The system as recited in claim 10, wherein the one or more processors are further configured to cause the system to generate the custom font bounding box for the digital text by:

generating a union set of glyph bounding boxes comprising glyph bounding boxes in the first set of glyph bounding boxes and glyph bounding boxes in the second set of glyph bounding boxes; and generating the custom font bounding box based on size dimensions of glyph bounding boxes from the union set of glyph bounding boxes.

12. The system as recited in claim 11, wherein the one or more processors are further configured to cause the system to generate the custom font bounding box based on the union set of glyph bounding boxes by:

determining, utilizing the size dimensions of glyph bounding boxes from the union set of glyph bounding boxes, a first minimum value and a first maximum value along a first axis and a second minimum value and a second maximum value along a second axis; and generating the custom font bounding box comprising corner points based on the first minimum value, the second minimum value, the first maximum value, and the second maximum value.

13. The system as recited in claim 10, wherein the one or more processors are further configured to cause the system to:

determine, for the first master instance, the first set of glyph bounding boxes by determining glyph bounding boxes for glyphs of the digital text comprising corner points at minimum boundary values or maximum boundary values of the first font bounding box; and determine, for the second master instance, the second set of glyph bounding boxes by determining glyph bounding boxes for the glyphs of the digital text comprising corner points at minimum boundary values or maximum boundary values of the second font bounding box.

14. The system as recited in claim 10, wherein the one or more processors are further configured to cause the system to:

generate, based on a plurality of design axes of the variable font, a first normalized design vector for the first master instance, a second normalized design vector for the second master instance, and a custom normalized design vector for the custom instance; and select the first master instance and the second master instance by comparing the custom normalized design vector to the first normalized design vector and the second normalized design vector.

15. The system as recited in claim 14, wherein the one or more processors are further configured to cause the system to select the first master instance and the second master instance by:
  determining, for a plurality of master instances of the variable font for the digital text comprising the first master instance and the second master instance, Euclidean distances between the custom normalized design vector and corresponding normalized design vector;
  sorting the plurality of master instances of the variable font for the digital text according to the Euclidean distances;
  selecting the first master instance based on a first Euclidean distance between the custom normalized design vector and a first normalized design vector for the first master instance; and
  selecting the second master instance based on a second Euclidean distance between the custom normalized design vector and a second normalized design vector for the second master instance.

16. The system as recited in claim 10, wherein the one or more processors are further configured to cause the system to:
  receive a request to update the design axis of the digital text to a new custom value;
  determine, utilizing the new custom value, one or more additional master instances of the digital text corresponding to one or more additional predetermined values of the design axis;
  determine one or more additional sets of glyph bounding boxes comprising one or more additional size dimensions that contribute to one or more additional font bounding boxes for the digital text;
  generate an updated custom font bounding box for the digital text based on the one or more additional sets of glyph bounding boxes; and
  modify the digital text within the digital content item utilizing the updated custom font bounding box.

17. The system as recited in claim 16, wherein the one or more processors are further configured to cause the system to modify the digital text within the digital content item by modifying a position of the digital text relative to other digital content within the digital content item.

18. A method comprising:
  receiving, by at least one processor, a request to set a custom value of a design axis of digital text comprising a variable font in a digital content item, the variable font comprising one or more design axes that adjust one or more visual attributes of the digital text during rendering;
  performing a step for determining a custom font bounding box for the digital text based on the custom value of the design axis; and
  determining, by the at least one processor, a position of one or more glyphs of the digital text within the digital content item according to the custom font bounding box.

19. The method as recited in claim 18, wherein receiving the request to set the custom value of the design axis of the digital text comprises receiving a request to change the design axis for the digital text from an initial value to the custom value.

20. The method as recited in claim 19, wherein determining the position of the one or more glyphs of the digital text within the digital content item comprises modifying the position of the one or more glyphs of the digital text from a first position corresponding to an initial font bounding box to a second position corresponding to the custom font bounding box.

* * * * *